US012694218B1

(12) United States Patent　　　　(10) Patent No.:　US 12,694,218 B1
Roy et al.　　　　　　　　　　　　　(45) Date of Patent:　　　　Jul. 28, 2026

(54) MULTI-FIELD SEMANTIC VECTOR INDEXING FOR NAMED ENTITY RETRIEVAL IN TENANT-SPECIFIC ENVIRONMENTS

(71) Applicant: Trove Solutions, Inc., San Francisco, CA (US)

(72) Inventors: Shivaal K Roy, San Francisco, CA (US); Daniel D Goldman, San Francisco, CA (US); William W Peng, San Mateo, CA (US)

(73) Assignee: Trove Solutions, Inc., San Francisco, CA (US)

( * ) Notice: Subject to any disclaimer, the term of this patent is extended or adjusted under 35 U.S.C. 154(b) by 0 days.

(21) Appl. No.: 19/335,569

(22) Filed: Sep. 22, 2025

(51) Int. Cl.
　　G06F 16/334　　　(2025.01)
　　G06F 40/295　　　(2020.01)
　　G06F 40/30　　　(2020.01)
(52) U.S. Cl.
　　CPC .......... G06F 40/295 (2020.01); G06F 16/334 (2019.01); G06F 16/3344 (2019.01); G06F 16/3347 (2019.01); G06F 40/30 (2020.01)
(58) Field of Classification Search
　　CPC ............. G06F 16/3329; G06F 16/3334; G06F 16/334; G06F 16/3347; G06F 40/295; G06F 40/30; G06F 16/3344
　　See application file for complete search history.

(56) References Cited

U.S. PATENT DOCUMENTS

| | | | | | |
|---|---|---|---|---|---|
| 10,089,389 | B1 * | 10/2018 | Van Rotterdam | ... | G06F 16/3329 |
| 2018/0137404 | A1 * | 5/2018 | Fauceglia | ................ | G06N 3/09 |

| | | | | | |
|---|---|---|---|---|---|
| 2020/0097879 | A1 * | 3/2020 | Venkata | ................... | G06N 3/09 |
| 2020/0210491 | A1 * | 7/2020 | Hajic | ..................... | G06F 16/316 |
| 2021/0149993 | A1 * | 5/2021 | Torres | .................... | G06V 10/40 |
| 2022/0180056 | A1 * | 6/2022 | Hong | ................... | G06N 3/0455 |
| 2022/0382984 | A1 * | 12/2022 | Gelli | ...................... | G06N 3/044 |
| 2024/0362286 | A1 * | 10/2024 | He | .......................... | G06F 16/93 |
| 2025/0094718 | A1 * | 3/2025 | Yan | ......................... | G06F 40/30 |
| 2025/0284888 | A1 * | 9/2025 | Khullar | ................. | G06F 40/205 |
| 2025/0322272 | A1 * | 10/2025 | Townsend-Last | ....... | G06N 5/04 |

FOREIGN PATENT DOCUMENTS

| | | | | | |
|---|---|---|---|---|---|
| KR | 102792375 | B1 * | 4/2025 | ........... | G06F 40/268 |

* cited by examiner

*Primary Examiner* — James E Richardson
(74) *Attorney, Agent, or Firm* — Fenwick & West LLP

(57)　　　　　　　ABSTRACT

A computer-implemented method for retrieving named entities using semantic similarity is disclosed. A query in natural language is received from a user to identify one or more named entities associated with domain-specific data of a domain. A transformer-based deep neural network decomposes the query into one or more semantic components expressed in natural language. Each component is converted into a query embedding and compared against a semantic index storing embeddings of named entities previously analyzed within the domain. The semantic index represents extracted semantic understandings of entities based on their characteristics from structured and unstructured domain data. Semantic embeddings most similar to the query embeddings are identified, and corresponding named entities are retrieved. A response including ranked matching entities is generated and returned to the user. The method enables precise retrieval of semantically similar entities while operating within a tenant-specific deployment environment to maintain data isolation and compliance.

19 Claims, 9 Drawing Sheets

Figure 3:
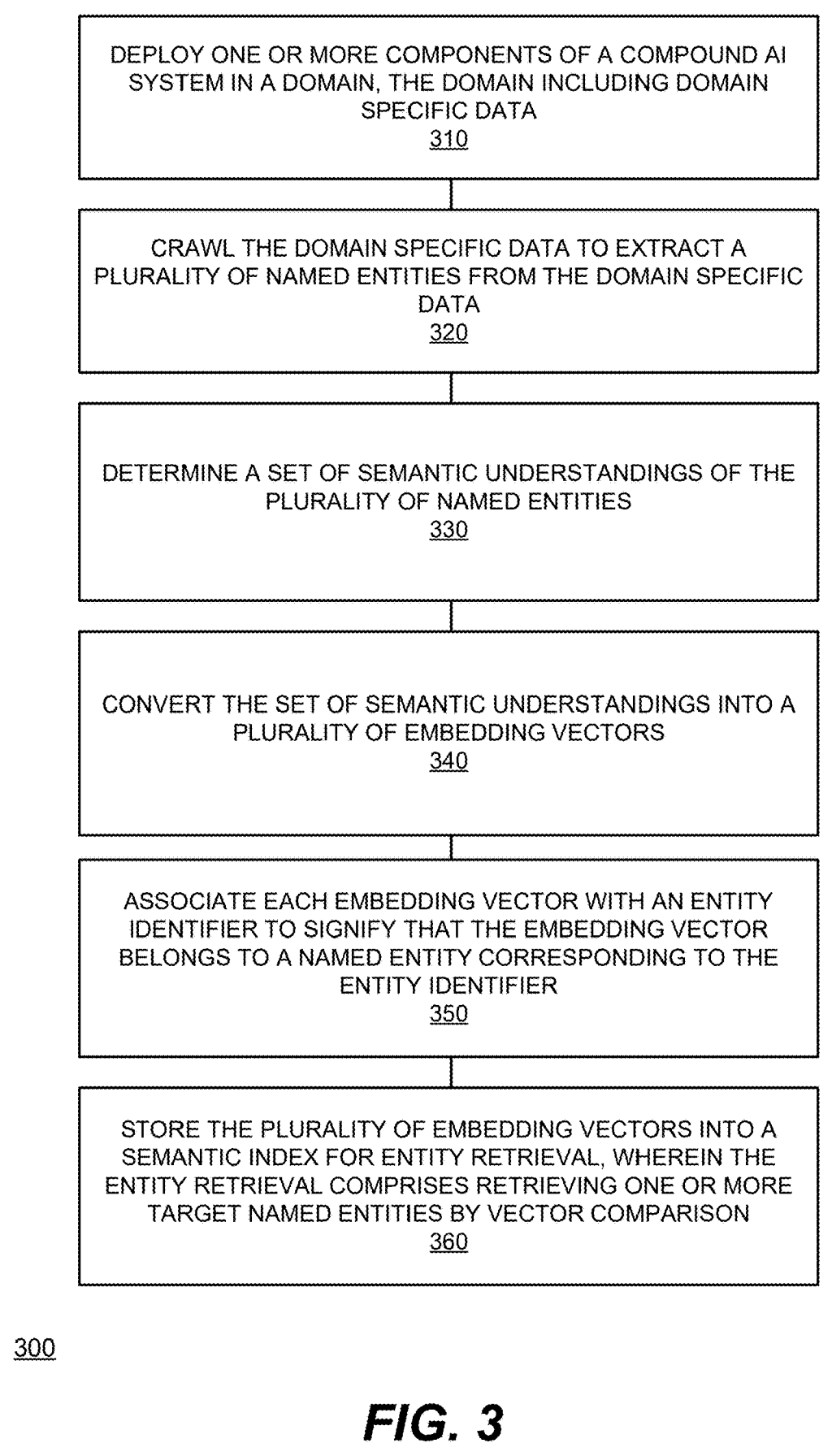

DEPLOY ONE OR MORE COMPONENTS OF A COMPOUND AI SYSTEM IN A DOMAIN, THE DOMAIN INCLUDING DOMAIN SPECIFIC DATA
310

CRAWL THE DOMAIN SPECIFIC DATA TO EXTRACT A PLURALITY OF NAMED ENTITIES FROM THE DOMAIN SPECIFIC DATA
320

DETERMINE A SET OF SEMANTIC UNDERSTANDINGS OF THE PLURALITY OF NAMED ENTITIES
330

CONVERT THE SET OF SEMANTIC UNDERSTANDINGS INTO A PLURALITY OF EMBEDDING VECTORS
340

ASSOCIATE EACH EMBEDDING VECTOR WITH AN ENTITY IDENTIFIER TO SIGNIFY THAT THE EMBEDDING VECTOR BELONGS TO A NAMED ENTITY CORRESPONDING TO THE ENTITY IDENTIFIER
350

STORE THE PLURALITY OF EMBEDDING VECTORS INTO A SEMANTIC INDEX FOR ENTITY RETRIEVAL, WHEREIN THE ENTITY RETRIEVAL COMPRISES RETRIEVING ONE OR MORE TARGET NAMED ENTITIES BY VECTOR COMPARISON
360

Figure 5:
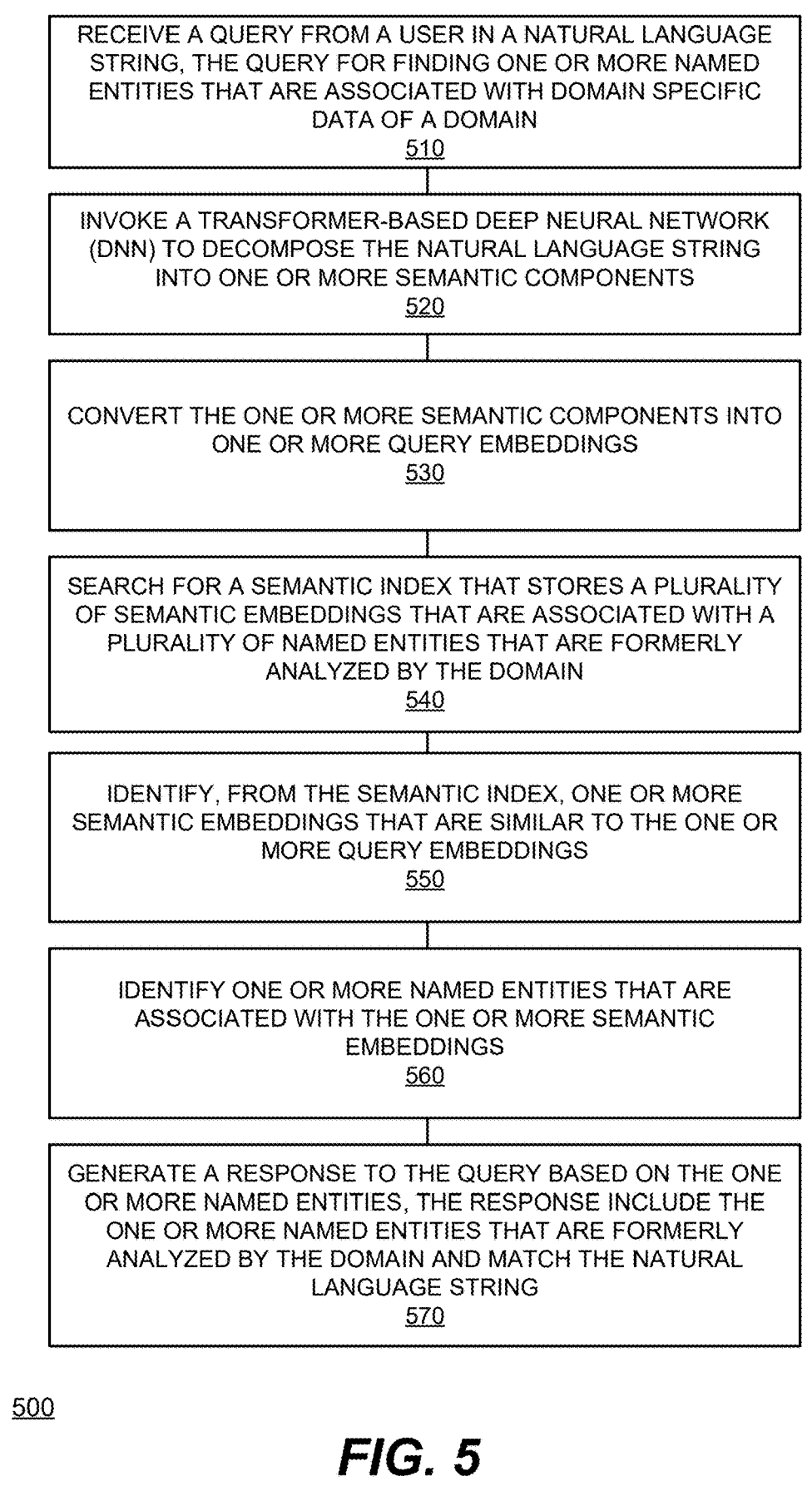

RECEIVE A QUERY FROM A USER IN A NATURAL LANGUAGE STRING, THE QUERY FOR FINDING ONE OR MORE NAMED ENTITIES THAT ARE ASSOCIATED WITH DOMAIN SPECIFIC DATA OF A DOMAIN
510

INVOKE A TRANSFORMER-BASED DEEP NEURAL NETWORK (DNN) TO DECOMPOSE THE NATURAL LANGUAGE STRING INTO ONE OR MORE SEMANTIC COMPONENTS
520

CONVERT THE ONE OR MORE SEMANTIC COMPONENTS INTO ONE OR MORE QUERY EMBEDDINGS
530

SEARCH FOR A SEMANTIC INDEX THAT STORES A PLURALITY OF SEMANTIC EMBEDDINGS THAT ARE ASSOCIATED WITH A PLURALITY OF NAMED ENTITIES THAT ARE FORMERLY ANALYZED BY THE DOMAIN
540

IDENTIFY, FROM THE SEMANTIC INDEX, ONE OR MORE SEMANTIC EMBEDDINGS THAT ARE SIMILAR TO THE ONE OR MORE QUERY EMBEDDINGS
550

IDENTIFY ONE OR MORE NAMED ENTITIES THAT ARE ASSOCIATED WITH THE ONE OR MORE SEMANTIC EMBEDDINGS
560

GENERATE A RESPONSE TO THE QUERY BASED ON THE ONE OR MORE NAMED ENTITIES, THE RESPONSE INCLUDE THE ONE OR MORE NAMED ENTITIES THAT ARE FORMERLY ANALYZED BY THE DOMAIN AND MATCH THE NATURAL LANGUAGE STRING
570

Input Layer
702

Hidden Layers
706

Output Layer
704

MULTI-FIELD SEMANTIC VECTOR INDEXING FOR NAMED ENTITY RETRIEVAL IN TENANT-SPECIFIC ENVIRONMENTS

BACKGROUND

Modern enterprise computing environments often manage large volumes of information spread across both structured systems, such as customer relationship management platforms, and unstructured repositories, including document archives, emails, and internal knowledge bases. Information in these repositories tends to be multi-faceted, representing different conceptual aspects of the subject described. Conventional indexing approaches frequently merge all of these facets into a single undifferentiated representation, which causes nearest-neighbor similarity searches to blend unrelated characteristics. This blending reduces the precision of retrieval and forces unnecessary similarity comparisons that increase computational cost.

User queries expressed in natural language frequently combine several distinct conceptual elements in a single request. Without a way to isolate each element and process it in the context of its respective facet, search systems often produce incomplete results or include irrelevant matches. For example, when a query describes an industry, a type of offering, and a type of customer in the same sentence, a single generic comparison is unable to separate these dimensions and match them independently against the database.

The categories and descriptors most relevant for retrieval are not always static. In many operational settings, new attributes emerge over time that become important for search, even though they were not defined when the indexing schema was first created. Rigid data models are ill-suited to incorporating such evolving descriptors on the fly. This limitation means that important but previously undefined characteristics cannot easily be indexed or retrieved, which reduces the adaptability of the system to changing business needs.

In addition, semantic similarity search and keyword-based retrieval across related content often operate in isolation from one another. Semantic techniques may surface conceptually relevant subjects but overlook references that appear only through specific terminology in associated documents. Keyword document search, on the other hand, can yield relevant terms but does not inherently link retrieved documents back to the broader profile they describe. Combining these modes of retrieval at scale introduces challenges in accurately correlating results from different search modalities while maintaining performance and relevance.

BRIEF DESCRIPTION OF THE DRAWINGS

Figure (FIG. 1 is a block diagram illustrating an example computing system environment, in accordance with some embodiments.

FIG. 3 is a flowchart depicting a process for semantic index creation process in accordance with some embodiments.

FIG. 5 is a flowchart depicting a process for generating a response to a query, in accordance with some embodiments.

Figure 1:
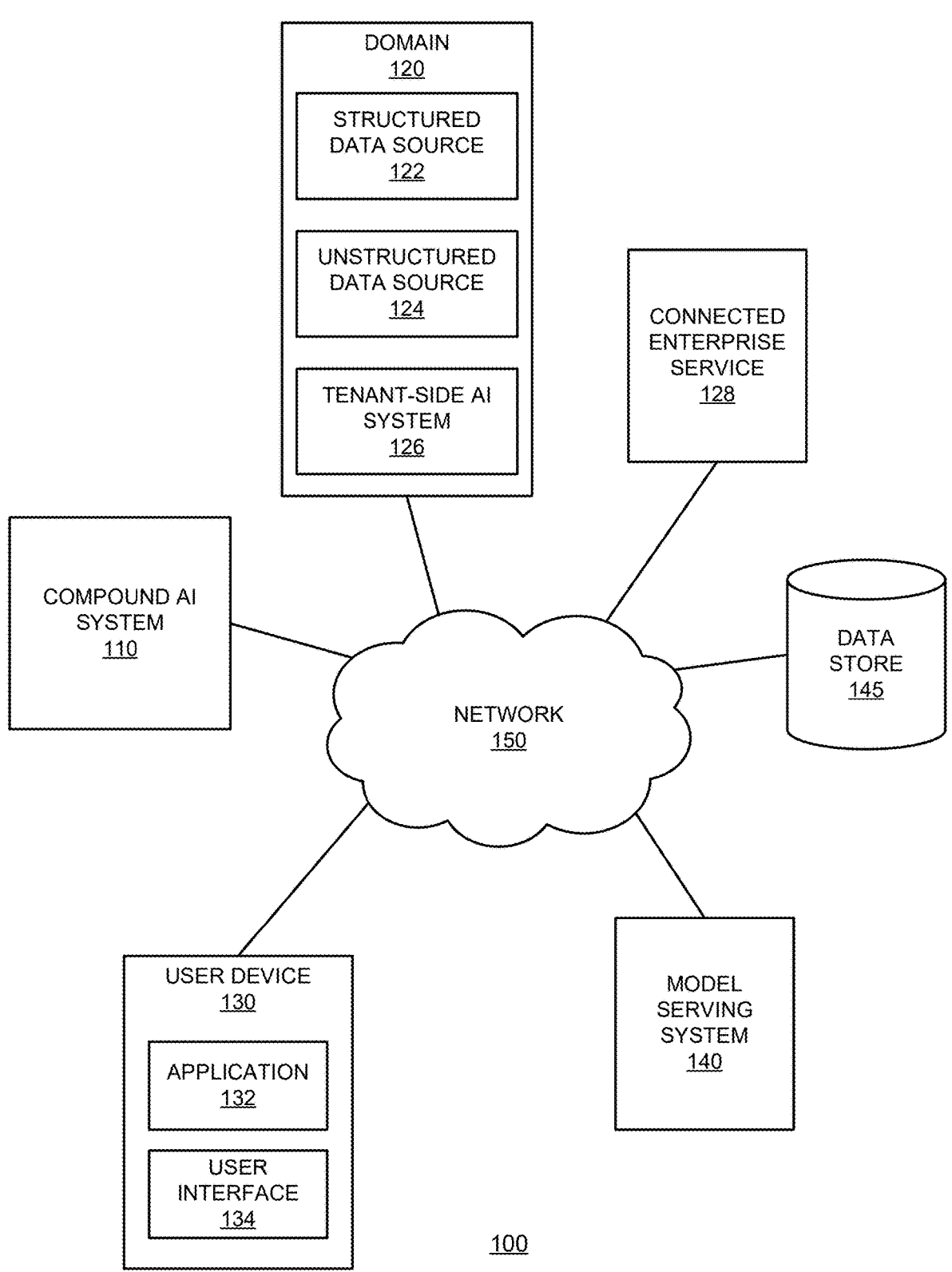

The figures depict, and the detailed description describes various non-limiting embodiments for purposes of illustration only.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to exemplary embodiments of the present disclosure, examples of which are illustrated in the accompanying figures. Wherever practicable, like reference numbers are used throughout the figures to refer to the same or similar elements. The figures are presented for illustrative purposes only and should not be construed as limiting the scope of the disclosure. Those skilled in the art will recognize that variations and modifications may be made to the illustrated embodiments without departing from the scope and principles described herein.

The disclosure relates to a compound AI system for constructing and operating a multi-dimensional semantic indexing architecture for searching named entities within a domain-specific environment. Information about each named entity is gathered from heterogeneous enterprise data sources, including structured data sources and unstructured repositories of source artifacts. Such information may be contained within the computing boundaries of a single domain. The system enriches each entity instance with structured descriptors aligned to multiple semantic dimensions, such as industry classifications, product or service types, and end-customer categories, with generation of dynamic dimensions based on distinctive attributes discovered in the available data. A semantic indexing process embeds the descriptor values for each semantic dimension into corresponding independent vector indexes, with each vector linked to a persistent entity identifier. This arrangement creates a set of field-specific semantic vector indexes that jointly represent the multi-faceted profile of each named entity, enabling fine-grained data representation while preserving privacy and compliance requirements inherent to tenant-specific deployment spaces.

On the retrieval side, user input is processed through a query decomposition stage in which natural language requests are parsed and mapped to the relevant semantic dimensions, together with an entity decomposition stage in which, when applicable, specific named entities mentioned in the request are resolved to their stored entity instances. The decomposed elements are then transformed into vector representations, each corresponding to a particular semantic dimension, and these vectors are compared against the pre-built semantic indexes for those dimensions. The comparison may be executed as nearest-neighbor similarity searches within each field-specific vector index to identify entities with embeddings most closely matching the query's decomposed components. Results from the various dimension-specific searches are aggregated, intersected, or otherwise combined to produce a ranked set of entity instances satisfying the query parameters.

System Overview

Referring now to Figure (FIG. 1, shown is a block diagram illustrating an example system environment 100 of a compound artificial intelligence (AI) system 110, in accordance with some embodiments. By way of example, the system environment 100 includes a compound AI system 110, a domain 120, a connected enterprise service 128, a user device 130, a model serving system 140, and a data store 145. The entities and components in the system environment 100 may communicate with each other through network 150. In various embodiments, the system environment 100 may include fewer or additional components. The system environment 100 also may include different components.

The components in the system environment 100 may each correspond to a separate and independent entity or may be controlled by the same entity. For example, in some embodiments, the compound AI system 110 and the data store 145 may be operated by the same entity. In other embodiments, the compound AI system 110 and the data store 145 are operated by different entities. Likewise, the models provided by the model serving system 140 may be controlled by the compound AI system 110 or by a third party.

While each of the components in this disclosure is sometimes described in disclosure in a singular form, the system environment 100 and elsewhere in this disclosure may include one or more of each of the components. For example, the compound AI system 110 may simultaneously serve multiple user devices 130 even though this disclosure describes the user device 130 in a singular form. There can also be different types of data stores 145, which are conveniently referred to as a single data store 145. Likewise, while some of the components are described in a plural form, in some embodiments each of those components may have only a single instance in the system environment 100.

In some embodiments, a compound AI system 110 may generate and operate a multi-dimensional semantic indexing framework that processes structured and unstructured domain-specific data to enable semantic search and retrieval of named entities based on natural language input. The compound AI system 110 may also be referred to as a compound AI system, an AI agent system, an analytics AI system, a semantic search system, or a query system. The compound AI system 110 may include one or more deep neural network (DNN) language models such as large language models (LLMs) that are instantiated as AI agents and semantics search agents with prompt instructions.

In some embodiments, the compound AI system 110 may be configured to create and maintain a multi-field semantic index for named entities within a domain 120. The named entities can be enterprise organizations, portfolio companies, or other business entities. The compound AI system 110 may operate over heterogeneous data sources within the domain 120, including structured data sources 122 such as enterprise customer relationship management (CRM) platforms, and unstructured data sources 124 such as internal documents, reports, emails, communications, and other stored content. The compound AI system 110 may acquire such data through automated crawling or ingestion processes and may normalize the information into an internal representation where each named entity is associated with a persistent internal identifier.

In some embodiments, the compound AI system 110 may perform semantic enrichment of each named entity instance by generating structured descriptors aligned to multiple semantic dimensions. These semantic dimensions may include, for example, the industry of the entity, the type of product or service offered, and the category of end-customers served. The compound AI system 110 may also define additional dynamic semantic dimensions when distinctive attributes are detected in the available data. For each populated semantic dimension, the compound AI system 110 may generate a descriptive text value, encode the value into an embedding vector, and store the embedding within a vector index dedicated to that dimension. Each embedding in the index may be tied to the corresponding entity identifier to enable retrieval and cross-dimension matching.

In some embodiments, the compound AI system 110 may support processing of natural language queries to identify relevant named entities by mapping portions of the query to relevant semantic dimensions and, when applicable, resolving entity names mentioned in the query to stored entity records. The compound AI system 110 may transform each query component into an embedding and search the appropriate dimension-specific vector indexes to identify related entities based on nearest neighbor's similarity. Results from the searches across different dimensions may then be combined to produce a refined set of entities that satisfy the query intent.

In some embodiments, components of the compound AI system 110 may be implemented using one or more computing devices, which may also be referred to as computing servers. A computing device may include one or processors, which may work collaboratively or in a distributed manner, and memory for storing executable instructions. The instructions, when executed by the one or more processors, cause the one or more processors to perform various steps and features described in this disclosure. The computing devices used in compound AI system 110 may refer to different physical or virtual configurations depending on the deployment environment. In one embodiment, a server may be a physical computing device that executes software instructions to perform context and semantic extraction, embedding generation, or machine learning inference. In another embodiment, a server may be a logical pool of computing devices that may be co-located at the same physical site, such as a server room or data center, or distributed across multiple geographical locations, such as in a cloud computing environment, a distributed computing framework, or a virtual server network. In some embodiments, the server may include one or more virtualization instances, such as a containerized execution environment, a virtual machine, a virtual private server, a virtual kernel, or another suitable virtualization layer. Each virtualization instance may host specific subcomponents of the compound AI system 110, including the input API, model API, DNN models, and may be independently scaled based on system workload or prediction frequency requirements.

In some embodiments, a domain 120 may represent a customer organization that engages the compound AI system 110 to process data and perform semantic search, indexing, and retrieval functions within isolated, tenant-specific computing boundaries. A domain 120 may be associated its own data, which may be referred to as domain-specific data or simply domain data. A domain 120 may hire compound AI system 110 to generate one or more domain-specific AI agents for performing tasks for the domain 120. A domain 120 may operate under a set of operational rules, protocols, and data governance standards that influence how the compound AI system 110 acquires, enriches, and retrieves entity-related information. Such operational characteristics may be expressed as domain-specific rules, which may include data access permissions, compliance requirements, structured indexing definitions, update schedules, and timing constraints for processing. In some embodiments, a domain 120 may provide configuration parameters such as allowable query formats, priority ranking criteria, or enrichment policies, which may influence how the compound AI system 110 prepares and interprets semantic descriptors and how search operations are conducted across multiple semantic dimensions.

In some embodiments, a domain 120 may vary across different types of organizations supported by the compound AI system 110. Examples of a domain 120 may include a private equity firm, an investment bank, a corporate venture arm, a market research organization, or a legal services entity, each with different operational structures and data use cases. The domain-specific rules associated with a given domain 120 may differ in scope and complexity. Certain domains 120 may require rigid data ingestion and classification procedures according to regulatory standards, while others may allow more flexible ingestion and enrichment policies based on evolving business needs. The compound AI system 110 may be configured to support simultaneous deployments to multiple domains 120, where each deployment instance is isolated with its own configuration, validation logic, indexing policies, and retrieval workflows. In some embodiments, a domain 120 may also maintain a body of historical data that can be leveraged by the compound AI system 110 to improve or contextualize semantic extraction and matching processes in subsequent operations.

In some embodiments, the boundary of a domain 120 may vary, depending on situations. Examples of a domain 120 may include a group of affiliated corporations, a standalone enterprise, a division within a larger corporate group, an institutional unit such as an academic department, or a governmental sub-agency. A domain 120 may be associated with a knowledge ontology defining data categories, entity types, hierarchical classifications, relationship mappings, and procedural workflows specific to the organization. The exact boundary of a domain 120 may not necessarily align with legal ownership boundaries; for example, a domain 120 may consist of a subsidiary or a business unit within a multinational conglomerate, or may represent a collaborative project involving multiple affiliated organizations sharing the same operational data environment without sharing data outside the defined tenant boundary.

In various embodiments, domains 120 may represent different types of organizations with distinct operational purposes. For example, a domain 120 may be a private equity firm using the compound AI system 110 to analyze portfolio companies, identify potential acquisitions, and compare industry peers. In another example, a domain 120 may be a financial institution applying the compound AI system 110 for client risk profiling, market segmentation, and counterparty analysis. In another example, a domain 120 may be an insurance provider using the system for semantic indexing of claims data, policy summaries, and related communications. In some embodiments, a domain 120 may be a healthcare provider or hospital network where the compound AI system 110 indexes medical supplier relationships, partner institutions, or specialized service offerings. Additional examples of domain 120 may include law firms indexing case references, consulting firms compiling market intelligence, research universities managing project collaborators, or government agencies tracking vendor entities. Each domain 120 may be associated with its own set of data governance policies, access restrictions, internal workflow rules, validation requirements, and operational timelines. The domains 120 served by the compound AI system 110 may remain fully separated to maintain privacy and prevent cross-domain data exposure.

In some embodiments, a structured data source 122 may store domain data that is structured. The structured data source 122 may take the form of a data repository associated with a domain 120 that stores information in a predefined schema or organized format. A structured data source 122 may be the data from, for example, a connected enterprise service 128 such as a CRM platform, a portfolio management database, or an enterprise resource planning system. The structured data source 122 may contain entity records, transactional data, metadata fields, and other attributes associated with named entities relevant to the domain 120. The compound AI system 110 may access the structured data source 122 to identify entities, retrieve associated structured attributes, and obtain identifiers such as organization names, domain addresses, or classification codes. In some embodiments, the compound AI system 110 may extract both required and optional fields from the structured data source 122, and may process the values to generate semantic descriptors for use in multi-dimensional indexing. The compound AI system 110 may support connecting to multiple structured data sources 122 within the same domain 120, each with its own schema, access rules, and update frequency.

In some embodiments, an unstructured data source 124 may store domain data that is unstructured. The unstructured data source 124 may take the form of a data repository within a domain 120 that stores information not organized according to a fixed schema. Examples of an unstructured data source 124 may include document storage systems, file repositories, and cloud-based content management platforms containing diligence reports, market studies, contracts, or presentations. Additional examples may include email repositories containing correspondence, internal messaging platforms used for team communication, and meeting transcripts. In some embodiments, an unstructured data source 124 may also include multimedia files such as audio recordings, images, or video content relevant to named entities in the domain 120. The compound AI system 110 may connect to unstructured data sources 124 to ingest, parse, and convert the content into a machine-processable representation suitable for semantic enrichment and indexing. Unstructured data sources 124 may coexist with structured data sources 122 in the same domain 120, allowing the compound AI system 110 to correlate free-form narrative or qualitative information with structured fields. The unstructured data source 124 may reside in on-premises storage within the domain 120, in a private cloud service, or in hybrid file systems that integrate multiple storage environments under the control of the domain 120.

In some embodiments, a tenant-side AI system 126 may represent components of the compound AI system 110 that are deployed and operated within the computing environment of a domain 120. The tenant-side AI system 126 may execute data ingestion processes for both structured data sources 122 and unstructured data sources 124 that are maintained within the domain 120 to ensure sensitive data remains inside the tenant's (domain 120) controlled infrastructure. The tenant-side AI system 126 may include crawlers or connectors to access connected enterprise services 128, internal file repositories, messaging archives, or other enterprise systems. In some embodiments, the tenant-side AI system 126 may perform semantic enrichment of entity records by executing natural language processing and large language model inference through local resources or by interfacing with an external model serving system 140 under policies set by the domain 120. The tenant-side AI system 126 may also generate embeddings for semantic dimensions, construct vector indexes, and store these indexes in a local data store 145 for retrieval operations. By maintaining these indexing and retrieval components locally, the tenant-side AI system 126 may support semantic search, similarity matching, and entity resolution within a fully isolated, domain-specific deployment of the compound AI system 110.

In some embodiments, a connected enterprise service 128 may refer to a third-party software-as-a-service (SaaS) platform or application that provides data management, analytics, or operational support to a domain 120. In some embodiments, the connected enterprise service 128 may be hosted and operated outside the computing environment of the domain 120. A connected enterprise service 128 may be accessed over a network and may store or process data relevant to the domain 120 in a structured format. An example of a connected enterprise service 128 is a SaaS-based CRM system that maintains records of companies, contacts, and interactions. Other examples may include SaaS portfolio management platforms used by investment firms, supply chain management SaaS systems used by manufacturing organizations, cloud-based human capital management platforms used by enterprises to manage workforce information, or legal case management SaaS systems used by law firms. In some embodiments, connected enterprise services 128 may also include SaaS marketing automation platforms, SaaS financial market intelligence tools, SaaS regulatory compliance systems, or specialized industry subscription databases that deliver standardized datasets for analysis. The compound AI system 110 may interface with one or more connected enterprise services 128 through secure connections or application programming interfaces to ingest structured data for semantic enrichment, indexing, and retrieval in connection with domain-specific operations. The connected enterprise service 128 may be one data source that serves as a structured data source 122 for a domain 120.

In some embodiments, a connected enterprise service 128 may further include specialized portfolio reporting applications used by private equity firms, such as Cobalt or equivalent platforms. These applications may maintain structured performance and operational data for portfolio companies, including financial metrics, investment stage details, and benchmark comparisons. The compound AI system 110 may interface with such portfolio reporting applications to ingest structured datasets that complement CRM records and diligence reports, thereby enriching entity profiles with domain-specific financial and operational descriptors.

In some embodiments, a user device 130 may be operated by a client, who may be an end user, such as an employee (e.g., an analyst) of a domain 120 (e.g., a private equity firm), to interact with the compound AI system 110 to submit natural language queries, review search results, explore entity profiles, and initiate retrieval processes over data indexed within the tenant-specific deployment. The user device 130 may also be referred to as a client. The user device 130 may execute an application 132 that provides a graphical user interface or other input/output mechanisms enabling the user to engage with features supported by the compound AI system 110. In some embodiments, the application 132 may allow the user to enter free-form search requests, filter results by semantic dimensions, and view detailed semantic descriptors for named entities. The user may also use the application 132 to compare multiple entities across dimensions, identify similar entities to a known reference entity, or refine search parameters to narrower criteria. The application 132 may prompt the user to provide missing input fields, select from suggested search terms, or confirm identified entities before proceeding with a retrieval process.

In some embodiments, the user device 130 may take the form of a smartphone, tablet, laptop, or other computing platform that supports mobile or web-based access to the application 132. The application 132 may present data derived from the compound AI system 110, such as ranked lists of matching named entities, entity-specific semantic dimension values, and extracted descriptors from both structured and unstructured sources. In various embodiments, the application 132 may allow interactive navigation between entity profiles, adjustment of similarity thresholds, and switching between search modes such as semantic, keyword, or hybrid. The user device 130 may further allow the user to trigger new indexing operations, export retrieved entity data, or flag specific results for follow-up analysis within the domain 120.

In some embodiments, a user interface 134 may be the interface of the application 132 and allow the user to perform various actions associated with application 132. For example, application 132 may be a software application, and the user interface 134 may be the front end. The user interface 134 may take different forms. In some embodiments, the user interface 134 is a graphical user interface (GUI) of a software application. In some embodiments, the front-end software application 132 is a software application that can be downloaded and installed on a user device 130 via, for example, an application store (App store) of the user device 130. In some embodiments, the front-end software application 132 takes the form of a webpage interface that allows users to perform actions through web browsers. A front-end software application includes a GUI 134 that displays various information and graphical elements. In some embodiments, the GUI may be the web interface of a software-as-a-service (SaaS) platform that is rendered by a web browser. In some embodiments, user interface 134 does not include graphical elements but communicates with a server or a node via other suitable ways, such as command windows or application program interfaces (APIs).

In some embodiments, a model serving system 140 is a system that provides machine learning models configured to perform inference operations in response to natural language prompts or structured input features. The model serving system 140 may receive requests from the compound AI system 110 to execute specific model tasks such as parsing natural language queries into semantic dimension values, generating embeddings from textual descriptors, performing entity name resolution, or extracting structured facts from unstructured content. A model serving system 140 may belong to the compound AI system 110 or may be operated by a third party such as a foundational model provider. The tasks provided by the model serving system 140 may include, but are not limited to, conversational text generation, text classification, summarization, or other natural language processing (NLP) tasks relevant to semantic enrichment, multi-dimensional indexing, and query decomposition in support of domain-specific entity retrieval. In some embodiments, the machine learning models deployed by the model serving system 140 are models that are originally trained to perform one or more NLP tasks but are fine-tuned for semantic descriptor generation and structured data alignment. The NLP tasks may include, but are not limited to, entity recognition, relation extraction, topic classification, and similarity scoring. The fine-tuned tasks may be domain specific. For example, in some embodiments, one or more models are trained to classify a company's industry, extract product or service descriptions, and identify end-customer types from internal documents and public content.

The machine learning models served by the model serving system 140 may take different model structures depending on the nature of the task, the latency and throughput requirements, and the complexity of the input-output mappings involved. In some embodiments, one or more models are configured with a transformer deep neural network architecture. Specifically, the transformer model may be configured to receive text input tokenized into a sequence of input tokens and generate output tokens or vector representations that align with a defined feature structure. Transformer models are examples of language models that may or may not be autoregressive. In some embodiments, the models may retain the architecture of language models but are trained or re-trained to perform structured information extraction, task-specific evaluation, or domain-aligned response construction that aligns with enterprise-specific search and indexing objectives.

In some embodiments, the language models served by the model serving system 140 are large language models (LLMs) that are trained on large-scale corpora of text data to perform generalized language tasks. An LLM may be trained on billions of tokens from diverse domains and may subsequently be fine-tuned using training sets aligned with specific enterprise operations. For example, an LLM may be configured to extract structured insights from analyst notes, diligence reports, or case summaries within a domain 120. An LLM may include at least 1 million, at least 10 million, at least 50 million, at least 100 million, at least 500 million, at least 1 billion, at least 15 billion, at least 135 billion, at least 175 billion, at least 500 billion, at least 1 trillion, or at least 1.5 trillion trainable parameters, and may employ a deep neural network with a transformer-based structure to support the modeling of linguistic and contextual patterns.

Since an LLM may include a substantial number of parameters and require significant computational resources for inference and training, the LLM may be deployed on infrastructure configured for high-performance computing, such as clusters equipped with graphics processing units (GPUs) or other specialized hardware. In some embodiments, the LLM may be trained, deployed, or hosted on a cloud infrastructure platform that supports scalable model serving operations. The LLM may be pre-trained by the model serving system 140 and optionally fine-tuned by either the model serving system 140 or the compound AI system 110 using data derived from a specific domain 120. An LLM may be trained on a wide range of data sources, including web-based content, industry taxonomies, company websites, and internal enterprise documents, and may generate outputs that reflect semantic relationships between concepts, entities, and attributes across multiple semantic dimensions. Based on the scale of training and the structure of the prompt used, the LLM may support context-aware query decomposition, semantic similarity scoring, and dynamic semantic dimension generation for entity indexing and retrieval.

In some embodiments, a data store 145 may be used to retain various types of data associated with the domain 120 and/or the compound AI system 110, including entity records, semantic descriptors, embeddings, document content, and configuration metadata. The data store 145 may include structured storage for organized datasets such as CRM-extracted fields, semantic dimension values, entity identifiers, and vector indexes for each semantic field. In some embodiments, the data store 145 may also retain unstructured data, including diligence reports, contracts, emails, chat transcripts, multimedia files, and other source artifacts ingested from unstructured data sources 124. The data store 145 may be integrated with the compound AI system 110 to facilitate access to both raw ingested content and processed semantic indexes during retrieval operations. In various embodiments, the data store 145 may support indexing, retrieval, and versioning of time-stamped records, allowing for historical comparison of entity profiles, rollback to prior indexing states, and tracking of changes to descriptors and embeddings over time.

A data store 145 includes one or more storage units, such as memory, which take the form of a non-transitory and non-volatile computer storage medium to store various data. The computer-readable storage medium is a medium that does not include a transitory medium, such as a propagating signal or a carrier wave. In one embodiment, the data store 145 communicates with other components by a network 150. This type of data store 145 may be referred to as a cloud storage server. Examples of cloud storage service providers may include cloud-based platforms such as providers of infrastructure-as-a-service that support elastic storage and compute capacity. In some embodiments, instead of a cloud storage server, a data store 145 may be a storage device that is controlled and connected to a server, such as the computing system associated with the compound AI system 110. For example, the data store 145 may take the form of memory (e.g., hard drives, flash memory, discs, ROMs, etc.) used by the server, such as storage devices in a storage server room that is operated by the organization managing the deployment of the compound AI system 110. A data store 145 may also be operated by a domain 120 and be operated within the physical boundary or the cloud of the domain 120 to hold raw, crawled, and/or indexed content. The data store 145 might also support various data storage architectures, including block storage, object storage, or file storage systems. Additionally, the data store 145 may include features like redundancy, data replication, and automated backup to ensure data integrity and availability. A data store 145 can be a database, data warehouse, data lake, or similar structure capable of supporting large-scale enterprise prediction and optimization workflows.

Communication among a compound AI system 110, a domain 120, a connected enterprise service 128, a user device 130, a model serving system 140 and a data store 145 may be transmitted via a network 150. In some situations, a network 150 may be a local network that includes using technology such as Wi-Fi or Bluetooth. In some situations, a network 150 may be a public network such as the Internet. In one embodiment, the network 150 uses standard communications technologies and/or protocols. Thus, the network 150 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 150 can be represented using technologies and/or formats, including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. The network 150 also includes links and packet-switching networks such as the Internet.

Example Compound AI System

Figure 2:
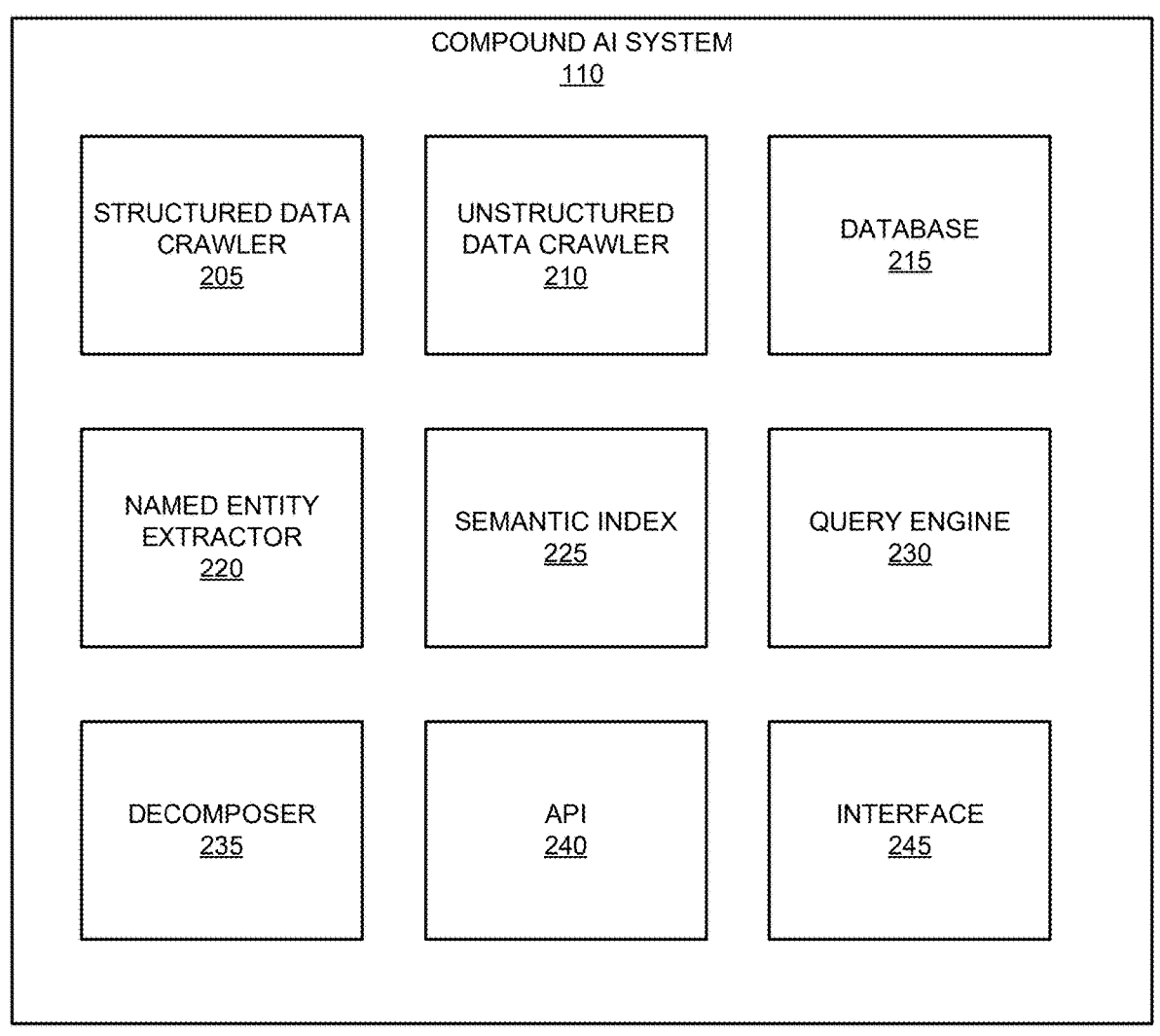
FIG. 2 is a block diagram illustrating an example compound AI system, in accordance with some embodiments.

FIG. 2 is a block diagram illustrating an example compound AI system 110, in accordance with some embodiments. In some embodiments, a compound AI system 110 may include a structured data crawler 205, unstructured data crawler 210, a database 215, a named entity extractor 220, a semantic index 225, a query engine 230, a decomposer 235, a gateway application programming interface (API) 240, and an interface 245. The components and engines may be configured as special purpose processing system configured to execute functionality as further describe herein. In various embodiments, the compound AI system 110 may include additional, fewer, or different components. The functionalities described in various components may also be distributed in a different manner among the components.

In some embodiments, the compound AI system 110 may include a structured data crawler 205 that may access, acquire, and process enterprise information from a domain 120. The structured data crawler 205 may connect to one or more structured data sources 122 maintained by the domain 120, such as operational databases, CRM systems, or portfolio tracking applications. The structured data crawler 205 may also connect to one or more connected enterprise services 128, which may include SaaS platforms providing structured data storage and analytics for the domain 120. The structured data crawler 205 may extract data in a semantic-oriented manner. For example, the extracted data may be aligned to capture key information about named entities that is compatible with later semantic enrichment and indexing steps. In some embodiments, the structured data crawler 205 may operate by prompting an LLM, such as one that is provided by a model serving system 140, with predefined field definitions to extract values of interest for each entity, such as industry classification, product or service description, and customer category. The structured data crawler 205 may store the extracted data in a structured intermediate form associated with persistent entity identifiers, enabling cross-linkage with additional data acquired from unstructured data sources 124. In some embodiments, the structured data crawler 205 may be configured to run on a recurring schedule within the tenant-side AI system 126 to captures changes in the structured data source 122 to reflect such changes in updated semantic indexes.

In some embodiments, the structured data crawler 205 may operate with different extraction patterns to accommodate variations in data schemas across different structured data sources 122 or connected enterprise services 128. The structured data crawler 205 may be invoked with a set of predefined semantic fields relevant to the entity indexing process, where the predefined fields may be selected to match common analytical needs within the domain 120. In other embodiments, the structured data crawler 205 may dynamically determine relevant fields to extract by invoking an LLM, which may be provided by the model serving system 140, to analyze the available schema, infer potentially relevant attributes, and suggest inclusion of dynamic fields representing domain-specific or context-specific factors. Examples of dynamically generated fields may include geographic attributes, operational status indicators, or relationship flags such as "has overseas operations" or "is in regulatory review." The structured data retrieved by the structured data crawler 205 may include company names, entity identifiers, standardized classification codes, recorded descriptions, and quantitative measures stored in tabular form. In some embodiments, the structured data crawler 205 may also gather metadata such as timestamps, data source identifiers, and user-defined tags from the structured data source 122. The extracted outputs may be persisted in a data store 145 within a tenant-side AI system 126 environment.

In some embodiments, the compound AI system 110 may implement conflict-resolution and authority weighting mechanisms during semantic enrichment. When multiple data sources provide inconsistent values for the same semantic dimension, the system may evaluate the relative authority of each source based on metadata such as origin, recency, and trust ranking. For example, values extracted from a company's official website may be weighted more heavily than those found in informal analyst notes, while structured CRM entries may supersede ambiguous references in unstructured correspondence. This filtering and prioritization process ensures that semantic indexes reflect the most reliable representation of each named entity while preserving traceability to the original sources.

In some embodiments, the structured data crawler 205 may also be configured to operate using non-AI-based extraction techniques to extract structured data. Such approaches may include the use of rule-based parsers, schema-driven extractors, and pattern-matching algorithms that are tailored to the known field structures of the structured data sources 122 or connected enterprise services 128. For example, the structured data crawler 205 may apply predefined mapping rules that directly associate specific database column names or API field identifiers with target semantic fields in the entity indexing process. In some cases, the structured data crawler 205 may use regular expressions, fixed keyword lists, or deterministic parsing logic to identify and retrieve relevant values from tabular data without requiring machine learning analysis. These extraction methods may be particularly effective when the data schema is stable, well-documented, and consistent across ingestion runs. In some embodiments, the structured data crawler 205 may operate in a hybrid mode, where initial extraction is performed using traditional deterministic techniques for standardized fields, and machine learning or LLM-based enrichment is applied only to fields requiring contextual interpretation or dynamic field generation.

In some embodiments, the structured data crawler 205 may utilize predefined or dynamically generated prompt templates to guide the LLM in extracting domain-specific attributes of named entities from a structured data source 122 or connected enterprise service 128. For example, in a private equity setting, a prompt may instruct the model serving system 140 to "Review the given company record and extract the industry classification, primary product or service category, and primary customer segment," or "From the available structured fields, identify any geographic markets served, regulatory categories applicable, and investment stage of the company." In some embodiments, a prompt may request entity-specific financial descriptors by stating, "Identify revenue range, employee count range, and funding round stage, if available, for the company identified in the record." Another example of a domain-tailored prompt may be, "From the provided CRM data, determine whether the company is an existing portfolio company, a prospect under evaluation, or a historical investment that has been exited." In some embodiments, these prompts may be adapted in real time to reflect discovered schema variations. For example, the LLM may be directed to first scan the available field names and then populate semantic dimension values based on the detected fields most relevant to the private equity analysis context.

In some embodiments, the compound AI system 110 may include an unstructured data crawler 210 to access and ingest information from one or more unstructured data sources 124 maintained within a domain 120. The unstructured data crawler 210 may connect to internal document repositories, file storage systems, cloud-based content management platforms, email archives and servers, internal messaging platforms, and other content stores that contain free-form narrative or non-tabular information related to named entities. The unstructured data crawler 210 may operate within the tenant-side AI system 126 to ensure that sensitive content remains within the computing boundaries of the domain 120. The unstructured data crawler 210 may parse a wide range of formats, including text documents, spreadsheets, presentations, PDFs, scanned images with machine-readable text, and multimedia transcripts. In some embodiments, the unstructured data crawler 210 may extract relevant portions of the content that reference named entities of interest. The unstructured data crawler 210 may tag these excerpts with metadata such as source location, creation date, and author information. The extracted unstructured content may be stored in a data store 145 for use in subsequent semantic enrichment steps by the compound AI system 110.

In some embodiments, the unstructured data crawler 210 may perform semantic-guided extraction by invoking a model serving system 140 to identify and isolate specific passages or concepts within large unstructured files that correspond to predefined or dynamically generated semantic dimensions. For example, in a private equity setting, the unstructured data crawler 210 may be instructed to locate and extract textual analysis describing a company's competitive positioning, recent strategic initiatives, or operational risks from diligence reports and meeting notes. The unstructured data crawler 210 may also scan for references to key customers, suppliers, technologies, or regulatory issues within broader narrative content. The extraction process may retain context around the matched passages to enable more accurate entity enrichment when the data is later processed into embeddings. In some embodiments, the unstructured data crawler 210 may be configured to run on a recurring or event-triggered basis so that newly added documents within the unstructured data sources 124 are regularly incorporated into the semantic index of the compound AI system 110.

In some embodiments, the structured data crawler 205 and the unstructured data crawler 210 may operate differently. For example, the unstructured data crawler 210 may be optimized to parse non-schema-based, narrative-rich content from unstructured data sources 124, which may require natural language understanding, passage-level relevance detection, and contextual tagging before the content can be transformed into structured descriptors. In contrast, the structured data crawler 205 may operate with field-based prompts to directly retrieve attribute values from structured repositories, while the unstructured data crawler 210 may use content-summarization or information-extraction prompts to convert lengthy, unformatted text into discrete data elements aligned to the semantic indexing framework. The outputs of both crawlers may ultimately be linked to the same persistent entity identifiers within the data store 145, enabling unified semantic enrichment across heterogeneous enterprise data.

In some embodiments, a database 215 may be provided to store domain-specific data within the computing boundaries of a domain 120. The database 215 may encompass one or more interrelated databases, each serving a designated role in the data lifecycle. A first category of databases within the database 215 may be configured to store raw ingested data acquired from structured data sources 122, connected enterprise services 128, and unstructured data sources 124. Such raw data storage may preserve original file formats, field structures, and associated metadata for later reference. In some embodiments, raw data may include unprocessed CRM records, diligence reports, correspondence, contracts, meeting transcripts, and other enterprise artifacts as received by the compound AI system 110.

In some embodiments, a second category of databases within the database 215 may store semantically processed data including structured descriptors, embedding vectors, and persistent named entity identifiers generated by the compound AI system 110. The semantically processed data may represent higher-level understanding derived from the raw data, where each named entity is linked to one or more semantic dimensions such as industry classification, product type, customer category, and dynamically generated attributes. The persistent named entity identifiers stored in the database 215 may support consistent cross-referencing between different sources and enrichment outputs, enabling seamless retrieval across heterogeneous data inputs. In some embodiments, the semantically processed data may be partitioned by semantic dimension to align with the field-specific vector indexes used during retrieval operations, thereby allowing the compound AI system 110 to execute dimension-aligned similarity searches while maintaining the isolation and data governance requirements of the domain 120.

In some embodiments, a named entity extractor 220 may be implemented within the compound AI system 110 to identify and extract named entities from data collected within a domain 120. The named entity extractor 220 may operate over both structured data stored in the database 215 and unstructured content ingested from unstructured data sources 124. The named entity extractor 220 may be configured to recognize instances of entities such as companies, organizations, products, customers, and other relevant entity types based on the operational focus of the domain 120. In some embodiments, the named entity extractor 220 may interact with a model serving system 140 to perform large language model inference for entity recognition, leveraging natural language processing techniques to parse free-form text and detect named entities within narrative content. When processing structured records from structured data sources 122 or connected enterprise services 128, the named entity extractor 220 may identify specific fields that correspond to entity names and may normalize extracted names to ensure consistency across data sources. The extracted named entities may be linked to persistent internal identifiers that are stored in the database 215, enabling unified reference across semantic dimensions and downstream processing stages.

In some embodiments, named entities identified by the named entity extractor 220 may vary depending on the operational focus of the domain 120. For example, in a private equity setting, named entities may include portfolio companies, potential acquisition targets, competitors within a specific industry, or key suppliers associated with an investment evaluation. In a financial services domain 120, named entities may include client organizations, counterparties, regulatory bodies, financial instruments, or transaction participants. In a healthcare domain 120, named entities may include hospitals, clinics, medical device manufacturers, pharmaceutical companies, healthcare service providers, and insurance carriers. In a legal services domain 120, named entities may include law firms, corporate clients, opposing parties, court jurisdictions, regulatory agencies, and cited cases. In a government or public sector domain 120, named entities may include contractors, partner agencies, legislative bodies, municipalities, and public infrastructure projects. In a research institution domain 120, named entities may include collaborating organizations, funding agencies, individual researchers, research labs, and published studies. These examples illustrate that the types of named entities recognized and extracted by the named entity extractor 220 may be dependent on the business context, data sources, and analytical objectives of the domain 120.

In some embodiments, the named entity extractor 220 may apply semantic disambiguation and context evaluation to evaluate whether entities with similar names are accurately distinguished. The named entity extractor 220 may prompt the model serving system 140 with entity extraction instructions tailored to the data type, for example, "Identify all company names, customer organizations, and product lines mentioned, and associate each with surrounding descriptive text." In a private equity setting, the named entity extractor 220 may additionally recognize references to portfolio companies, prospective investments, competitors, or market peers found in diligence reports, meeting notes, analyst commentary, and CRM entries. The named entity extractor 220 may process multilingual content where applicable, using language-aware prompts to capture entities in their native naming form while also storing standardized equivalents. In some embodiments, the output of the named entity extractor 220 may include the extracted entity name, the associated entity identifier, source metadata, and surrounding context text, which may be fed into subsequent semantic enrichment processes for embedding generation and population of field-specific semantic vector indexes within the compound AI system 110.

In some embodiments, the compound AI system 110 may incorporate a source authority weighting mechanism during semantic enrichment to improve the accuracy and reliability of extracted semantic dimensions. When generating semantic descriptors for a named entity, the system may prioritize information from authoritative sources such as internally generated reports, verified CRM records, or domain trusted repositories over less authoritative sources such as publicly crawled websites or unverified third party data. The weighting mechanism may include assigning confidence scores to extracted attributes based on the provenance of the underlying document, freshness of the data, and historical reliability of the source. These confidence scores may be used to resolve inconsistencies between sources, bias LLM generated descriptors toward higher authority inputs, and discard or downgrade conflicting information from low authority sources. In some implementations, the confidence weighted descriptors may be stored alongside standard semantic descriptors within the semantic index 225, enabling the query engine 230 to factor source authority into similarity searches and ranking results.

In some embodiments, a semantic index 225 may be maintained by the compound AI system 110 to store semantic representations of named entities in a vectorized form. Each named entity within a domain 120 may be associated with multiple characteristics. Each characteristic corresponds to a semantic dimension such as industry classification, product or service type, end-customer category, or dynamically generated attributes specific to the entity. The compound AI system 110 may generate a separate embedding vector for each characteristic, with each embedding stored within a field-specific vector index and linked to a persistent entity identifier. This configuration may allow the semantic index 225 to store multiple embeddings per named entity, enabling fine-grained similarity searches across one or more semantic dimensions. The structure of the semantic index 225 may be optimized for nearest-neighbor retrieval, clustering, or cross-dimensional aggregation, thereby supporting complex analytical queries over heterogeneous enterprise data.

In some embodiments, the semantic index 225 may be constructed using various vectorization techniques to convert semantic descriptors into numerical vector forms. The compound AI system 110 may employ LLMs hosted by the model serving system 140 to process descriptor text and return dense embedding vectors that encode contextual meaning. In other embodiments, the compound AI system 110 may use domain-specialized transformer models, sentence encoders, or other neural embedding architectures trained on relevant enterprise corpora to generate vector representations. Additional vectorization techniques may include averaging word embeddings from pre-trained models, applying principal component analysis to reduce vector dimensions, or using hybrid embeddings that combine linguistic context with numerical or categorical metadata. The choice of vectorization approach may depend on the type of semantic dimension, the volume of available reference data, and the retrieval accuracy requirements of the domain 120.

In some embodiments, the conceptual framework of the semantic index 225 may extend beyond indexing named entities and may be applied to other types of concepts or knowledge structures. For example, similar multi-dimensional vector indexes may be used to represent projects, contracts, patents, research papers, medical procedures, or legal cases, where each indexed item is associated with multiple semantic dimensions relevant to the application domain. Each dimension may be independently vectorized and stored in a dedicated index. The compound AI system 110 may perform fine-grained semantic searches across diverse object types using unified retrieval techniques. This generalized indexing approach may enable the compound AI system 110 to support a wide range of enterprise analytics and decision-support scenarios while maintaining the isolation and privacy constraints required for each domain 120.

In some embodiments, the compound AI system 110 may maintain the semantic index 225 as a collection of separate field-specific vector indexes, with each index corresponding to a particular semantic dimension. A semantic dimension may represent a distinct category of descriptive information about a named entity, such as industry classification, product or service type, end-customer category, or a dynamically generated attribute identified through semantic analysis. For each semantic dimension, the compound AI system 110 may store a unique set of embedding vectors, where each embedding represents a semantic understanding for that field and is associated with the persistent entity identifier of the corresponding named entity. This one-index-per-field-type structure may allow the compound AI system 110 to perform similarity searches that are constrained to a specific semantic dimension or executed in parallel across multiple dimensions for more complex queries. By isolating embeddings for different semantic dimensions into dedicated indexes, the compound AI system 110 may reduce search space for targeted retrieval, improve precision for field-specific matching, and enable the selective aggregation of results from multiple dimensions when generating a ranked list of entities responsive to a query.

In some embodiments, a query engine 230 may be implemented within the compound AI system 110 to process and execute search requests over the semantic index 225 and other related data repositories of a domain 120. The query engine 230 may receive input from a client device 130. An end user such as an analyst of the domain 120 submits a natural language query specifying search criteria related to named entities. The query engine 230 may invoke a model serving system 140 to perform query decomposition, in which portions of the user input are mapped to one or more predefined or dynamically generated semantic dimensions represented in the semantic index 225. In scenarios where the query references a specific named entity, the query engine 230 may also execute entity resolution by retrieving the persistent entity identifier from the database 215 to locate stored semantic descriptors for that entity. The query engine 230 may then convert each identified query component into an embedding vector using a selected vectorization method and search the corresponding dimension-specific vector indexes for nearest-neighbor matches.

In some embodiments, the query engine 230 may support parallel search execution across multiple semantic dimensions. The query engine 230 may return intermediate result sets for each dimension-specific index and combining the intermediate result to produce a ranked or filtered set of named entities meeting the query requirements. The combination process may involve intersection, union, score-weighted ranking, or other aggregation strategies, depending on the query context and the retrieval objectives of the domain 120. The query engine 230 may also support hybrid search modes that combine semantic similarity matching with keyword-based searching over raw or processed text stored in the data store 145. For example, the query engine 230 may first identify candidate entities using semantic search across selected dimensions and then apply keyword matching within associated unstructured documents to further refine the results.

In some embodiments, the architecture and methods used in the query engine 230 may be generalized to execute queries over other types of multi-dimensional indexes beyond named entity profiles. The query engine 230 may operate over semantic indexes representing patents, legal cases, research publications, or supply chain assets, where each indexed object is represented by multiple independent vector dimensions. The query engine 230 may flexibly adapt its query decomposition, vectorization, and aggregation strategies according to the semantic schema of the target index.

In some embodiments, a decomposer 235 may be incorporated into the query engine 230 to break down inputs, such as a natural language query or a named entity reference, into discrete components suitable for semantic search and retrieval. The decomposer 235 may receive a query provided by a client device 130 and analyze the textual content to identify individual semantic dimensions that the query implicates. For example, in a private equity domain 120, the decomposer 235 may parse a query such as "Find me cybersecurity companies serving government agencies" into components representing an industry dimension ("cybersecurity") and an end-customer dimension ("government agencies"). In some embodiments, the decomposer 235 may invoke a model serving system 140 to perform natural language decomposition and structured mapping to align each detected concept with the predefined or dynamically generated semantic dimensions stored in the semantic index 225. Once the query is decomposed, the query engine 230 may generate a vector embedding for each identified semantic dimension and perform a similarity search across the corresponding field-specific vector index within the semantic index 225. The similarity search may identify stored vectors that are closest to the query vectors in the multidimensional vector space, with each stored vector being linked to a persistent entity identifier. By retrieving the entity identifiers associated with the most similar stored vectors, the compound AI system 110 may identify named entities that most closely match the characteristics described in the user's query. When the input contains a direct reference to a known named entity, the decomposer 235 may extract the entity's name, retrieve its persistent entity identifier from the database 215, and access stored semantic descriptors for use in targeted similarity searches.

In some embodiments, the decomposer 235 may handle multiple types of decomposition tasks beyond mapping user queries to semantic dimensions. The decomposer 235 may separate compound search instructions into independent search clauses, isolate filter conditions such as geography, time period, or operational status, and distinguish between entity attributes to be matched and free-text keywords to be applied in a hybrid search. The decomposer 235 may also operate on structured query inputs, such as form-based selections or API requests, where parameters are explicitly passed but still require alignment to the appropriate semantic fields. For entity resolution tasks, the decomposer 235 may decompose the named entity into multiple defining characteristics, such as industry classification, primary products or services offered, categories of end customers served, geographic presence, and dynamically generated attributes discovered during semantic enrichment, and then use these decomposed characteristics to generate embedding vectors for similarity matching. In some embodiments, the outputs of the decomposer 235 may be structured representations containing the detected semantic dimensions, extracted entity identifiers, and keyword terms, which are then used by the query engine 230 to perform parallel, dimension-specific vector searches and aggregated result ranking. Through this structured breakdown, the decomposer 235 may enable the query engine 230 to process complex and varied user inputs into actionable search components across the multi-dimensional indexing framework maintained by the compound AI system 110.

In some embodiments, when a user query cannot be mapped to any supported semantic dimensions during the decomposition process, the compound AI system 110 may provide interactive feedback to guide the user. The system may generate a clarification message through the user interface 134, explaining that the request does not align with the predefined or dynamically generated fields currently available for retrieval. The feedback may include suggestions for reformulating the query in terms of supported fields such as industry, product or service type, or end-customer category. This interactive guidance improves query transparency and helps users adapt their search criteria to align with the semantic indexing framework.

In some embodiments, an application programming interface (API) 240 may be used by the compound AI system 110 to facilitate the exchange of data, commands, and query instructions between different components of the compound AI system 110 and external systems operating within or outside a domain 120. The API 240 may establish the interface between the compound AI system 110 and a variety of communication protocols, formats, and components of the compound AI system 110. A communication channel supported by the API 240 may include, for example, secure HTTP-based requests, WebSocket connections, or message queue systems for asynchronous data exchange. In some embodiments, the API 240 may interface with the client device 130 to receive user queries, with the tenant-side AI system 126 to trigger crawling, enrichment, and retrieval processes, and with the model serving system 140 to transmit prompt instructions and receive generated outputs.

In some embodiments, the API 240 may also support integration with external enterprise applications and analytical platforms used by the domain 120. For example, a query may be conducted via a web-based chat interface, a dashboard application, or a business intelligence platform that communicates with the compound AI system 110 through the API 240. The API 240 may also support messaging channels such as email gateways, internal collaboration tools, or instant messaging platforms to allow submission of queries and delivery of results within existing communication workflows of the domain 120.

In some embodiments, an interface 245 may be provided by the compound AI system 110 to facilitate interaction between users and components of the compound AI system 110. The interface 245 may support the submission of natural language queries, selection of files from one or more unstructured data sources 124, upload of additional files, application of search filters, review of retrieved named entities, and exploration of detailed semantic descriptors associated with those entities. In some embodiments, the interface 245 may operate as a front-end application executable on a user device 130, either through a browser-based interface or a downloadable application distributed via a digital application store. The interface 245 may allow users to configure search parameters, adjust similarity thresholds for vector-based retrieval, select specific semantic dimensions to include in a search, and manage personalized settings such as default query scopes, preferred result formats, and saved search templates.

The interface 245 may take different forms. In one embodiment, the interface 245 may control or be in communication with an application that is installed in a user device 130. For example, the application may be a cloud-based SaaS or a software application that can be downloaded in an application store (e.g., APPLE APP STORE, GOOGLE PLAY STORE). The interface 245 may be a front-end software application that can be installed, run, and/or displayed on a user device 130. The interface 245 also may take the form of a webpage interface of the compound AI system 110 to allow clients to access data and results through web browsers. In some embodiments, the interface 245 may not include graphical elements but may provide other ways to communicate, such as through APIs.

In various embodiments, the components of the compound AI system 110 may be distributed in different fashions between the tenant-side AI system 126 and a server of the organization that sells and operates compound AI system 110. For example, in some embodiments, a domain 120 is a tenant that has domain specific data whose access needs to be restricted due to data privacy reasons. In some embodiments, a majority of the components of the compound AI system 110 can be deployed locally at the tenant side and is operated with a domain 120. For example, the structured data crawler 205, the unstructured data crawler 210, the database 215, the named entity extractor 220, the semantic index 225, the query engine 230, and decomposer 235 can be locally as part of the tenant-side AI system 126. A user may visit an interface 245 hosted by the server that is provided by the organization that sells and operates the compound AI system 110. For example, the interface 245 may be a web interface of the organization's SaaS platform. The user may provide a query input through the interface 245. The server uses one or more API requests via the gateway API to invoke one or more components in the tenant-side AI system 126 to carry out the query and return a response. In other embodiments, the components of the compound AI system 110 may reside entirely on the server side.

In some embodiments, while the semantic indexing and retrieval functions are deployed locally within a tenant-specific environment, the compound AI system 110 may provide access through a global user interface maintained by the system operator. This global interface may take the form of a web-based application or chat interface that connects via secure APIs to each customer's local deployment. The global user interface enables centralized delivery of user experience features while ensuring that all query processing, data enrichment, and retrieval occur strictly within the isolated computing boundaries of the tenant environment.

Semantic Index Creation

Figure 4:
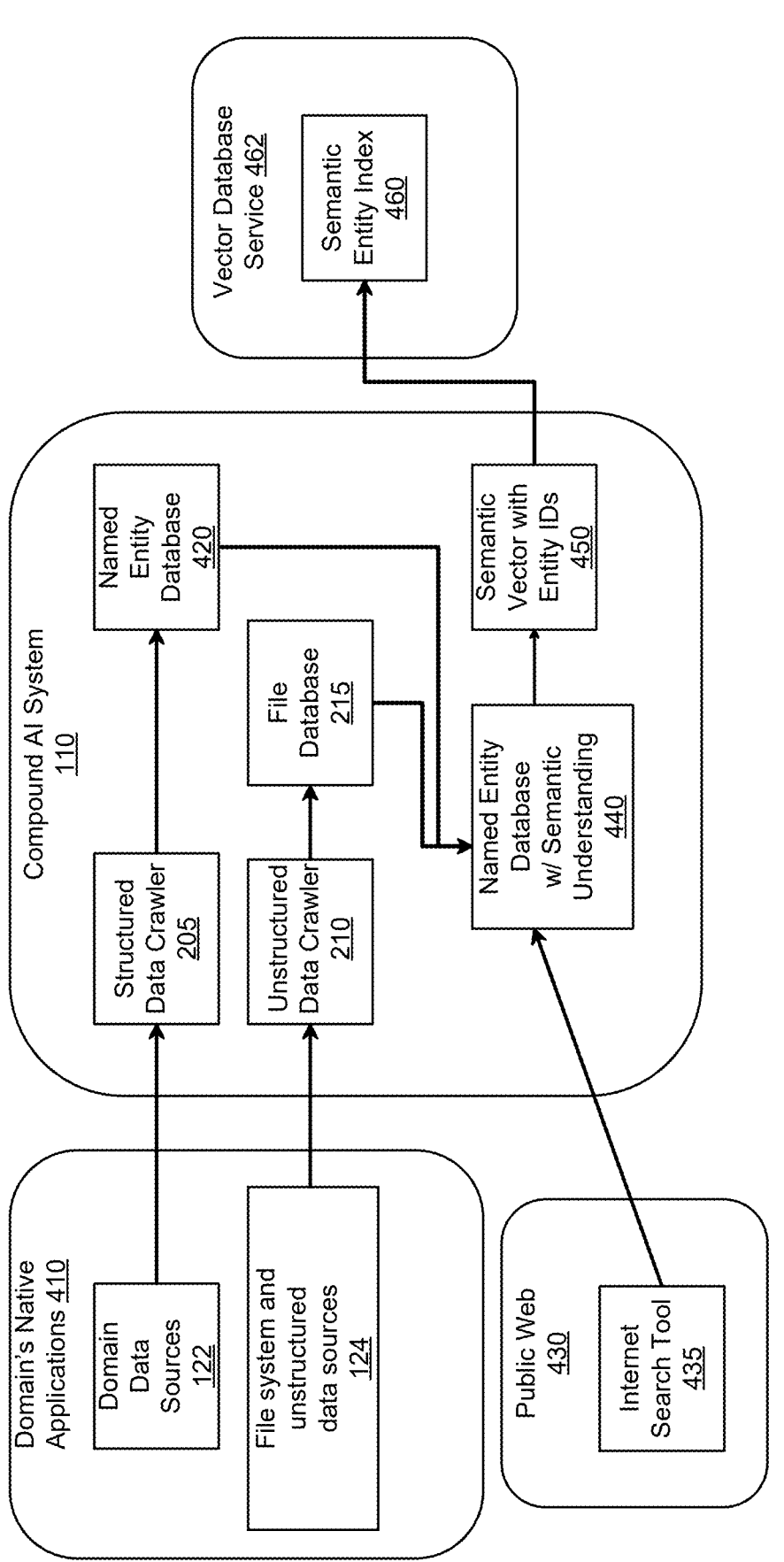
FIG. 4 is a conceptual block diagram illustrating the semantic index creation process, in accordance with some embodiments.

FIG. 3 is a flowchart depicting a process 300 for semantic index creation process in accordance with some embodiments. While some of the steps are described as being performed by the compound AI system 110, if applicable, the steps may also be performed by another computing device. In various embodiments, the process 300 may include additional, fewer, or different steps. The process 300 may also be performed in a different order than the illustration shown in FIG. 3. FIG. 4 is a conceptual block diagram illustrating the semantic index creation process, in accordance with some embodiments. FIG. 3 and FIG. 4 are described in conjunction with each other.

In some embodiments, the compound AI system 110 may deploy 310 one or more components of a compound AI system in a domain 120, the domain including domain-specific data. The deployment may occur within a tenant-specific computing environment dedicated to the domain 120 to ensure data privacy and governance compliance. In some embodiments, the deployment may include configuring secure connections to domain's native applications 410, which may provide access to various enterprise data sources used for later processing. The domain's native applications 410 may include domain data sources 122 that store structured information in predefined database schemas, such as records from a customer relationship management platform or other connected enterprise services 128.

In some embodiments, the deployment 310 may also include establishing secure access to file system and unstructured data sources 124. These unstructured data sources may include document repositories, cloud-based content management platforms, messaging archives, email servers, and other storage locations that contain narrative text, reports, presentations, or other free-form formats. Additionally, the deployment may optionally configure connectivity to public web sources 430, including integration with an internet search tool 435 that may later be used to identify publicly available content related to named entities of interest. This deployment step may allow relevant structured, unstructured, and external data connections to be operational within the domain's computing environment.

In some embodiments, the compound AI system 110 may crawl 320 the domain-specific data to extract a plurality of named entities from the domain-specific data. The domain-specific data may comprise both structured data and unstructured data, which may be obtained from sources within the domain 120 as well as, in some cases, from permitted external sources. As illustrated in FIG. 4, the compound AI system 110 may employ a structured data crawler 205 to crawl the structured data originating from domain data sources 122. Crawling the structured data may comprise accessing one or more structured data sources associated with the domain 120, including a connected enterprise service that stores entity-related records. The compound AI system 110 may retrieve records containing attributes of named entities from these structured data sources, identify predetermined fields in the records that correspond to semantic dimensions used for entity indexing, and extract values from the predetermined fields. These extracted values may be stored in association with persistent entity identifiers to support later semantic enrichment and indexing workflows.

In some embodiments, the compound AI system 110 may use an unstructured data crawler 210 to crawl unstructured data originating from unstructured data sources 124 within the domain's native applications 410. Crawling the unstructured data may comprise accessing one or more unstructured data sources such as document repositories, email archives, and internal messaging platforms. The compound AI system 110 may retrieve unstructured content containing narrative information related to named entities, parse the unstructured content to identify text segments relevant to either predefined or dynamically generated semantic dimensions, and store the parsed unstructured content in association with entity identifiers for subsequent semantic enrichment. In certain cases, the crawling step may further include accessing permitted external data sources, such as public web sources 430, using an internet search tool 435 to locate publicly available content relevant to identified named entities. The outputs from both the structured and unstructured crawling processes may then form a consolidated dataset that serves as the input for determining semantic understandings of each named entity in the subsequent processing step.

In some embodiments, the compound AI system 110 may determine 330 a set of semantic understandings of the plurality of named entities. Each named entity may include one or more semantic understandings based on the named entity's characteristics that are identified from the domain-specific data gathered during crawling 320. As illustrated in FIG. 4, structured data outputs from the structured data crawler 205 may be stored in the named entity database 420, while unstructured data outputs from the unstructured data crawler 210 may be stored in the file database 215. The compound AI system 110 may access these storage components to retrieve the relevant records, documents, and parsed content for each named entity.

In some embodiments, determining the set of semantic understandings may comprise retrieving characteristics associated with each named entity from the domain's structured and unstructured data sources, including records in the named entity database 420 and documents within the file database 215. The compound AI system 110 may identify values for predefined semantic fields such as industry classification, product or service type, and category of end customers. The compound AI system 110 may analyze the retrieved characteristics using a large language model provided by the model serving system 140 to accurately populate these predefined fields based on contextual understanding. The populated semantic fields for each named entity may then be stored in the named entity database with semantic understanding 440, linked to the corresponding entity identifiers.

In some embodiments, the compound AI system 110 may also identify semantic understandings through dynamic field creation. This may involve retrieving data associated with each named entity from both the structured and unstructured data gathered, analyzing the data using a large language model to automatically detect relevant fields not explicitly predefined, and extracting semantic descriptors from those detected fields. Examples of such dynamically generated fields may include geographic attributes, operational status indicators, and relationship attributes such as "has overseas operations" or "is engaged in ongoing litigation." The compound AI system 110 may associate the extracted semantic descriptors with the named entities and store the aggregated semantic profile for each entity in the named entity database with semantic understanding 440. This database thus becomes the enriched knowledge repository capturing all semantic dimension values for named entities, which will be used in subsequent steps for vectorization and semantic indexing.

In various embodiments, embeddings may be generated in different suitable ways. For example, embeddings may be generated through the application of deep neural networks, such as transformer architectures, recurrent neural networks, or convolutional neural networks, trained on large-scale corpora of structured and unstructured text. The embedding generation process involves a computer-executed transformation of tokenized input sequences into continuous high-dimensional vector representations, where each vector element corresponds to a learned latent dimension. These latent dimensions may encode semantic attributes that are not directly observable in the input data but are computationally inferred by the neural network through multi-layer weight matrices, activation functions, and backpropagation-based optimization. Embeddings may further be generated using dimensionality reduction techniques, such as principal component analysis (PCA) or autoencoder-based latent representation learning, to distill salient semantic features across multiple input dimensions. In some embodiments, embeddings may be derived using contrastive learning, where positive and negative pairs of textual descriptions are computationally processed to maximize semantic separation in the latent space. In other embodiments, graph neural networks may be employed to generate embeddings that capture relationships between entities in a knowledge graph, with the embeddings reflecting both node attributes and edge connectivity. The embedding generation requires specialized hardware and software resources, such as GPUs or TPUs executing machine-learning frameworks (e.g., TensorFlow, PyTorch), to perform the high-volume matrix multiplications and non-linear transformations necessary to compute embeddings across hundreds or thousands of latent dimensions. The embeddings thus cannot be produced by mere human mental processes, but rather are the result of machine-executed numerical computation that encodes semantic meaning into structured high-dimensional vectors. The resulting embedding vectors may then be stored in association with persistent entity identifiers for use in similarity searching, clustering, and other downstream computational tasks.

In some embodiments, the compound AI system 110 may store the generated embedding vectors in the semantic vector with entity IDs 450 component. This storage associates each embedding vector with both its originating semantic field and the entity identifier for the corresponding named entity. By storing the embedding and identifier pairings in the semantic vector with entity IDs 450, the compound AI system 110 may ensure that each vector's provenance can be traced back to an enriched semantic understanding stored in the named entity database with semantic understanding 440.

The semantic vector with entity IDs 450 thus serves as the direct bridge between semantic enrichment and the field-specific vector indexes contained in the semantic entity index 460 of the vector database service 462, which will be populated in the subsequent storing step.

In some embodiments, the compound AI system 110 may associate 350 each embedding vector with an entity identifier to signify that the embedding vector belongs to a named entity corresponding to the entity identifier. The entity identifier may be a persistent, unique reference assigned to the named entity when it was first recognized and stored during earlier processing, such as in the named entity database 420. This entity identifier may remain consistent across all stages of processing, allowing structured and unstructured data, semantic understandings, and embedding vectors to be linked without ambiguity.

In some embodiments, associating each embedding vector with an entity identifier may comprise explicitly linking an embedding vector corresponding to a given semantic understanding to the persistent identifier of the named entity from which the semantic understanding was derived. This linkage may be recorded within the semantic vector with entity IDs 450, creating a record that includes the embedding vector, the originating semantic field, and the entity identifier. The association may ensure that during retrieval operations, a vector similarity match can be accurately traced back to the specific entity in its entirety and not just to an isolated characteristic.

In some embodiments, the compound AI system 110 may enforce a consistent data model for maintaining embedding-to-entity mappings in the semantic vector with entity IDs 450. This data model may store metadata for each embedding, such as the timestamp of vector generation, the model version used for vectorization, and the semantic dimension type. The entity identifier linkage may enable retrieval processes to combine multiple vector similarity results across different semantic dimensions by aligning results with the same persistent entity identifier. Through this explicit association, the compound AI system 110 ensures that all downstream searches, aggregations, and similarity comparisons can accurately surface complete entity profiles, regardless of which semantic field produced the match.

In some embodiments, the compound AI system 110 may store 360 the plurality of embedding vectors into a semantic index for entity retrieval, wherein the entity retrieval comprises retrieving one or more target named entities by vector comparison. As illustrated in FIG. 4, this storage may occur within a vector database service 462, which may maintain a semantic entity index 460 organized into a plurality of field-specific vector indexes. The semantic entity index 460 is an example of semantic index 225, although in various embodiments, the compound AI system 110 may maintain different types of semantic index 225 that is beyond indexed named entity. Each field-specific vector index may correspond to a distinct semantic dimension, such as industry classification, product or service category, or customer type. The plurality of embedding vectors stored in each field-specific vector index may each be associated with a persistent entity identifier, allowing for retrieval of complete entity profiles during a search.

In some embodiments, storing the embedding vectors into the semantic entity index 460 may involve grouping vectors by semantic dimension to facilitate dimension-specific similarity searches, while maintaining links to the original semantic field descriptors in the named entity database with semantic understanding 440. This organization may allow the compound AI system 110 to retrieve entities matching the query in one or more semantic dimensions, and then aggregate results to generate a ranked set of candidate entities for the user. The vector database service 462 may support indexing techniques such as approximate nearest neighbor search to improve retrieval performance across large volumes of embeddings.

In some embodiments, entity retrieval from the semantic entity index 460 may comprise receiving a natural language query from a client device 130, decomposing the query into components corresponding to semantic dimensions, generating query embeddings for each component, and searching one or more field-specific vector indexes for embeddings similar to the query embeddings. The similarity search may compare the query embeddings against stored vectors to identify the closest matches in the high-dimensional vector space. Once similar embeddings are identified, the compound AI system 110 may retrieve the corresponding entity identifiers and return the associated named entities as results. The retrieval process may support combining matches from multiple semantic dimensions, applying filters such as geography or time period, and ranking results based on aggregated similarity scores. Through this vector-based comparison and aggregation process, the stored semantic index enables the compound AI system 110 to return entities that align semantically with the user's intent rather than just matching exact keywords.

Query Response

Figure 6A:
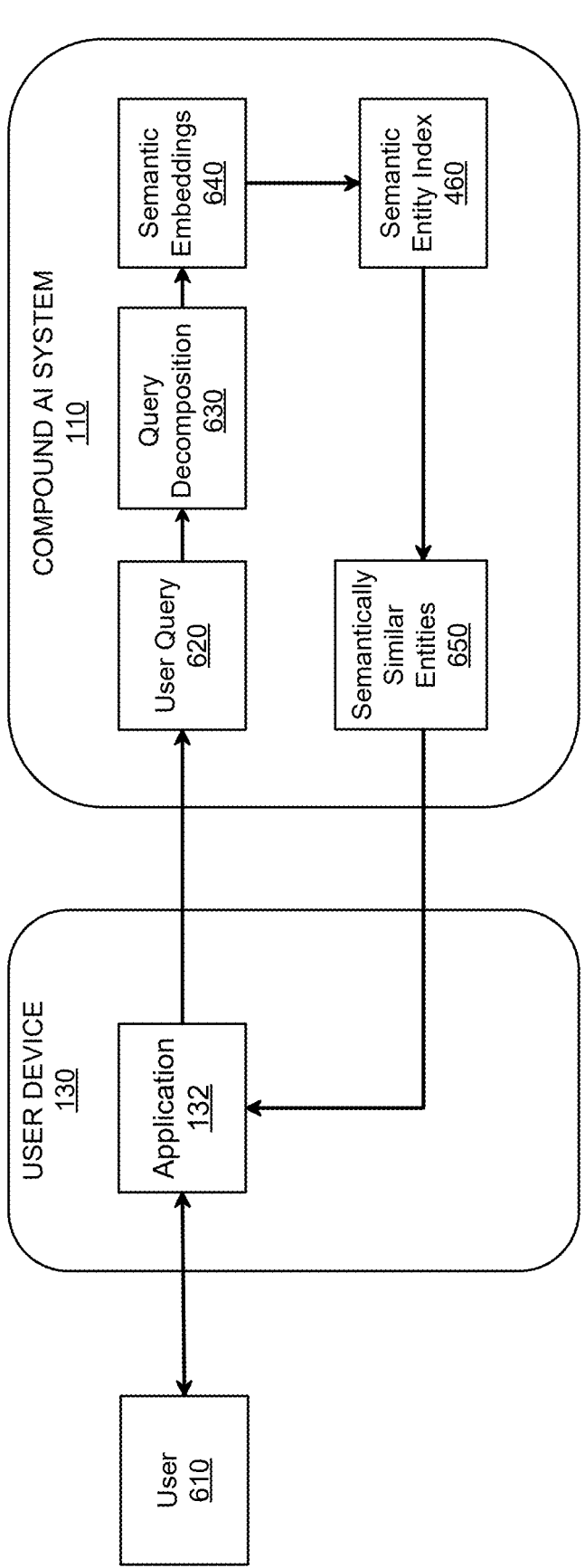
FIGS. 6A and 6B are conceptual block diagrams illustrating difference examples of query response processes, in accordance with some embodiments.
Figure 6B:
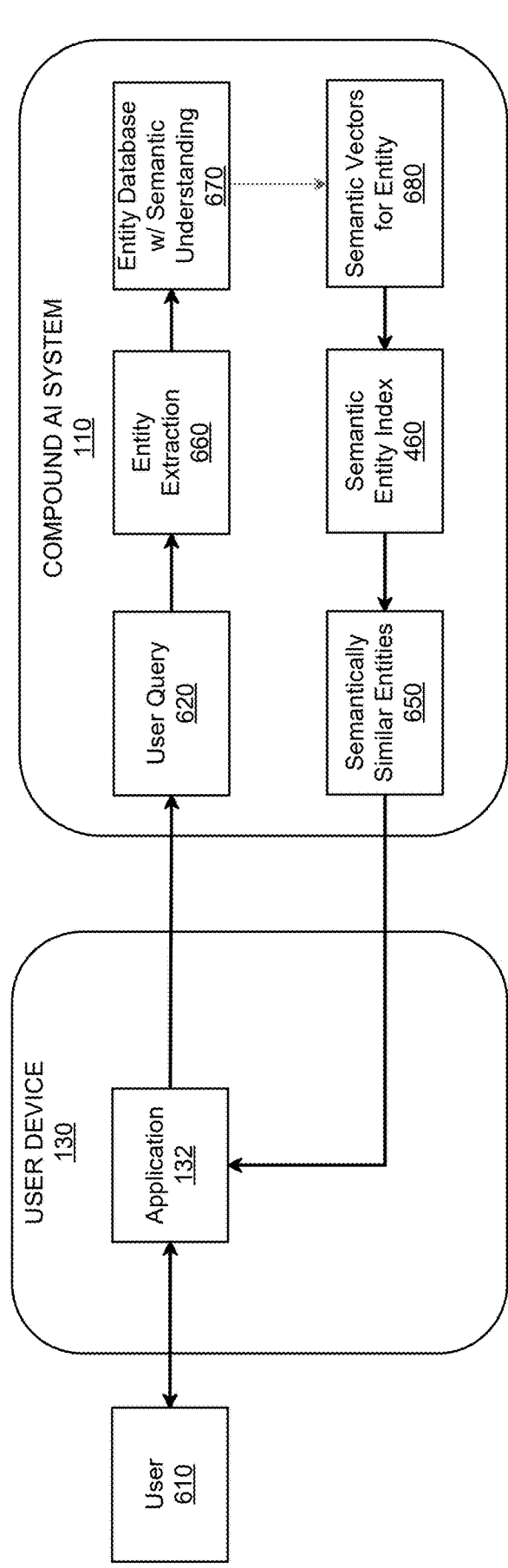

FIG. 5 is a flowchart depicting a process 500 for generating a response to a query, in accordance with some embodiments. While some of the steps are described as being performed by the compound AI system 110, if applicable, the steps may also be performed by another computing device. In various embodiments, the process 500 may include additional, fewer, or different steps. The process 500 may also be performed in a different order than the illustration shown in FIG. 5. FIGS. 6A and 6B are conceptual block diagrams illustrating difference examples of query response processes, in accordance with some embodiments. FIGS. 5, 6A and 6B are described in conjunction with each other.

In some embodiments, the compound AI system 110 may receive 510 a query from a user in a natural language string, the query for finding one or more named entities that are associated with domain-specific data of a domain. The user 610 may interact with the system through an application 132, which may be a web-based chat interface, a graphical user interface embedded in a desktop tool, or a client application integrated into the user's enterprise software environment. The natural language string can be typed, pasted, or even transcribed from speech input, and may contain descriptive criteria about desired entities, such as "Find me software companies that sell to hospitals" or "Which portfolio companies are similar to Stripe?"

The application 132 may forward the received query to the compound AI system 110, where it is first processed by the user query component 620. The natural language string may include either general descriptive terms or a direct reference to a known named entity, and it may combine multiple search conditions. In some implementations, queries can originate from authorized client devices within the tenant's secured network, ensuring that both the query content and its processing occur within isolated, tenant-specific computing boundaries to maintain privacy and compliance with data governance rules. This step establishes the entry point into the semantic search pipeline illustrated in FIG. 6A and FIG. 6B, initiating the series of processing operations that lead to identifying semantically similar entities.

In some embodiments, the compound AI system 110 may invoke 520 a transformer-based deep neural network (DNN) to decompose the natural language string into one or more semantic components. Each semantic component may include a version of the natural language string. Each semantic component may be expressed in natural language form. The decomposition process enables the compound AI system 110 to break down complex user queries into structured, field-aligned elements that can be processed against the semantic index.

When the query does not specify a particular named entity, the compound AI system 110, as illustrated in FIG. 6A, may process the query through the query decomposition 630, such as by using the decomposer 235. The transformer-based DNN may first identify portions of the query that correspond to predefined semantic dimensions used in the semantic index, such as industry, product/service type, or end-customer category. For instance, in the query "Find me software companies that sell to hospitals," the model detects "software" (product) and "hospitals" (end-customer). The system may then extract relevant natural language phrases for each semantic dimension, normalize the phrases to remove irrelevant words or formatting, and generate interpreted natural language representations that capture the user's intent. Each interpreted phrase is labeled with a corresponding semantic dimension before being passed to embedding generation.

If the query specifies a known named entity, the process in FIG. 6B may be used, involving the entity extraction 660. The transformer-based DNN may detect the presence of the named entity (e.g., "Stripe"), extract the named entity from the query, and look up its record in the entity database with semantic understanding 670. The entity extraction 660 may include decomposing the named entity using the decomposer 235. The compound AI system 110 may retrieve stored semantic dimension values for that entity, such as product ("payment processing software"), industry ("financial services"), or customer type ("startups, tech businesses"). These retrieved dimension values are then converted into interpreted semantic components for use in similarity searches.

In some embodiments, for a given query, both the processes illustrated in FIG. 6A and FIG. 6B may be used. For example, the compound AI system 110 may, based on the query, determine routing of the processing of the query. In some cases, both query decomposition 630 and entity extraction 660 are used in processing the query.

In both pathways, the compound AI system 110 may support multi-dimensional similarity by embedding each semantic component separately and searching dimension-specific indexes. This enables the identification of entities most similar to the query intent or to the target entity across multiple semantic dimensions.

In some embodiments, the compound AI system 110 may convert 530 the one or more semantic components into one or more query embeddings. This transformation is performed so that each identified semantic component, whether derived from query decomposition 630 or from entity extraction 660, is represented as a numerical vector in a high-dimensional space, enabling similarity measurements against stored entity data.

To generate an embedding for a semantic component, the compound AI system 110 may first produce a natural language descriptor for the component. For example, if the semantic dimension is "industry" and the interpreted value is "financial services," the complete phrase "industry: financial services" may be prepared as input to an embedding generation service, such as from an embedding model operated by a model serving system 140. The compound AI system 110 may apply the same process regardless of whether the semantic component originated from user query text or from retrieved semantic dimension values of a known entity.

In constructing query embeddings or any entity component embeddings, the compound AI system 110 follows the same embedding methodology used to build the semantic entity index 460. In that indexing process, the compound AI system 110 may have gathered data from structured sources (such as CRM fields) and unstructured sources (such as diligence reports, portfolio reviews, or internal documents). The content was enriched through semantic labeling, where each dimension, for example, product, end-customer, or industry, was assigned a concise descriptor by the system's large language model. Each descriptor was then embedded into a vector representation using the embedding model, with the resulting vectors stored in dimension-specific vector indexes inside the semantic entity index 460.

For query-time embedding, the same embedding model and tokenization process may be applied to maintain consistency between query embeddings and stored entity embeddings. The compound AI system 110 may also implement normalization steps, such as lowercasing, stop-word removal, or controlled vocabulary matching, to reduce vector noise. Each query embedding retains a mapping to its semantic dimension so that, during search, the embedding is compared only against the relevant portion of the semantic entity index 460. This dimensional isolation improves retrieval accuracy and ensures that semantically similar entities are identified based on matching field meaning rather than keyword coincidence.

In some embodiments, the compound AI system 110 may apply a ranking algorithm downstream of embedding generation, weighting dimensions unequally if certain query dimensions are more critical.

In some embodiments, the compound AI system 110 may search 540 for a semantic index that stores a plurality of semantic embeddings that are associated with a plurality of named entities that were formerly analyzed by the domain. In certain arrangements, the semantic index is implemented as the semantic entity index 460, which comprises embeddings generated and stored according to the methodology described for index construction-that is, one vector index per semantic dimension, with each embedding linked to a named entity identifier.

In some embodiments, the semantic entity index 460 may comprise a plurality of separate vector indexes, each vector index corresponding to a predetermined semantic dimension such as industry, product/service type, or end-customer category. This arrangement allows the compound AI system 110 to limit nearest-neighbor comparisons for a given query embedding to only the specific dimension it represents, improving the precision and efficiency of retrieval.

In some embodiments, the semantic entity index 460 may be generated within a tenant-specific deployment environment, ensuring that all stored embeddings are derived exclusively from that domain's structured and unstructured data sources. These may include, for example, CRM platforms, portfolio reporting tools, SharePoint repositories, diligence files, and internal messaging archives. Structured fields and parsed document content are semantically enriched and converted to embeddings using the same embedding generation process applied at query time, thereby ensuring alignment between query embeddings and stored entity embeddings.

In some embodiments, the compound AI system 110 may perform hybrid retrieval. In this mode, the search process may combine semantic similarity results from the semantic entity index 460 with keyword-based document retrieval results from a linked document database, such as a database that stores files from one or more unstructured data sources 124. A document-to-entity mapping enables filtering or intersecting candidate entities found via semantic similarity with those retrieved via keyword matching in the associated source artifacts. This approach allows rich queries, for example, "portfolio companies today that serve as a [keyword] customer," to be answered by intersecting portfolio company matches from semantic search with companies linked to documents containing the keyword.

In some embodiments, hybrid search workflows may combine semantic dimension filters with keyword-based document retrieval to surface relevant companies. For example, a user may request "portfolio companies today that serve as a [keyword] customer." In such a case, the query engine 230 may first filter candidate companies using semantic field values identifying portfolio membership. The system may then apply keyword search across unstructured documents to detect references to keyword, map the matching documents back to the associated companies, and intersect the two result sets. This combined workflow allows the compound AI system 110 to deliver company-centric results even when the user's query references a specific counterparty or contextual keyword.

The search 540 step results in each query embedding being matched against its relevant dimension index, producing a ranked set of nearest-neighbor embeddings, each mapping to one or more named entities for later steps in the process. The compound AI system 110 may apply filtering based on dimension type, metadata constraints (e.g., active status, date ranges), or domain-specific attributes before passing results to the entity identification stage. This ensures that only relevant and contextually appropriate matches are carried forward to the identification and ranking step.

In some embodiments, the compound AI system 110 may identify 550, from the semantic entity index 460, one or more semantic embeddings that are similar to the one or more query embeddings generated in step 530. The similarity determination may be based on nearest-neighbor search techniques in high-dimensional vector space, such as cosine similarity, dot product scoring, or Euclidean distance.

In some embodiments, in scenarios where the query is associated with a target named entity retrieved through entity extraction 660 (as in FIG. 6B), the compound AI system 110 may embed each semantic dimension value associated with that target entity. The compound AI system 110 may then search the corresponding dimension-specific vector indexes of the semantic entity index 460 with these embeddings, producing nearest neighbor results for each dimension separately. This separate dimensional search preserves semantic alignment and avoids conflation of unrelated dimensions, such as industry and customer types.

The compound AI system 110 may aggregate the nearest neighbor results across multiple dimensions into a unified candidate set. In doing so, the compound AI system 110 may combine results from each dimension according to an aggregation logic, for example, by summing similarity scores, computing weighted averages where certain dimensions carry more influence, or applying a relevance boosting factor based on query intent.

In some embodiments, the compound AI system 110 may apply a ranking algorithm to order the matching named entities based on aggregated similarity scores across the multiple semantic dimensions. This ranking is performed after dimensional aggregation, ensuring that entities with consistently high similarity across several relevant dimensions appear at the top of the results.

The identification process may also include threshold filtering to remove low-similarity matches before aggregation. For example, the compound AI system 110 may require a minimum similarity score per dimension before that dimension's match is considered in the final aggregation, improving accuracy by excluding weakly related embeddings. Additionally, metadata filters, for example, active portfolio status or date ranges of the stored information, may be applied at this stage to further refine results.

This step enables the compound AI system 110 to precisely pinpoint which stored semantic embeddings are most alike the query embeddings and sets up the subsequent process of mapping those embeddings back to their associated named entities for final output preparation.

In some embodiments, the compound AI system 110 may identify 560 one or more named entities that are associated with the one or more semantic embeddings identified in step 550. Each semantic embedding stored in the semantic entity index 460 is tied to a stored named entity identifier. When an embedding is retrieved as a match, the compound AI system 110 determines the corresponding named entity by reading the identifier stored alongside the embedding record.

In some embodiments, the compound AI system 110 may retrieve the named entity identifier associated with each matching semantic embedding. The compound AI system 110 may then map each matching embedding to its corresponding named entity identifier. The compound AI system 110 may merge identifiers across results sourced from different semantic dimensions to consolidate the list of entities that match the query intent.

In some embodiments, the compound AI system 110 may determine, for each named entity in the semantic entity index 460, a count of semantic embeddings that are similar to at least one of the query embeddings. The compound AI system 110 may select as candidate named entities those entities having the highest count of similar semantic embeddings. An aggregated similarity score for each candidate named entity may be computed based on the similarity of its matching semantic embeddings to the query embeddings. The compound AI system 110 may then rank the candidate named entities in descending order of their aggregated similarity scores, allowing the most relevant matches to be prioritized in the output.

In the process flow illustrated in FIG. 6A, step 560 corresponds to the stage where results from the semantic entity index 460 are mapped to specific named entities and compiled for return. Here, semantically similar entities 650 in the compound AI system 110 represent the identified set of named entities that match the query embeddings. These results are then sent back to the application 132 in the compound AI system 110 before being delivered to the user 610.

In the process flow illustrated in FIG. 6B, step 560 also maps the nearest neighbor results obtained from embeddings of a known target entity's semantic dimensions back to their named entities. This workflow involves entity extraction 660 to obtain the starting entity, retrieval from the entity database with semantic understanding 670, conversion to semantic vectors for entity 680, search through the semantic entity index 460, and finally mapping and consolidation into semantically similar entities 650. In both flows, this identification step serves as the crucial bridge between mathematical similarity scores and human-recognizable entity names that can be communicated in the final search results.

In some embodiments, the compound AI system 110 may generate 570 a response to the query based on the one or more named entities identified in step 560. The response may include a ranked list of named entities that were formerly analyzed within the domain and match the user's query expressed in the natural language string. The generation process may incorporate the aggregated similarity scores computed in earlier steps, ordering the named entities so that those with stronger semantic alignment appear higher in the list.

The compound AI system 110 may enrich the response by including metadata about each named entity, such as its industry classification, product or service type, end-customer category, or dynamically generated semantic dimensions. In some scenarios, the response may also display relevance scores, highlight which semantic dimensions matched the query best, or link to supporting documents available in the domain's repositories.

In embodiments that support hybrid retrieval, the compound AI system 110 may integrate results from both semantic similarity searches and keyword-based document searches. For example, after semantic matching narrows down a set of candidate entities, the system may retrieve documents containing specific keywords from the user's query, map those documents back to their associated entities, and intersect or merge these results with the semantic matches. This hybrid approach allows the response to reflect not only semantic concept closeness but also explicit textual associations within the domain's unstructured content.

The generation step may be executed entirely within a tenant-specific deployment environment to preserve confidentiality and comply with data sovereignty requirements. This ensures that the entities and data included in the response are exclusively derived from that tenant's domain data, without cross-domain contamination.

In the process flow of FIG. 6A, generating the response corresponds to sending the semantically similar entities 650 from the compound AI system 110 back to the application 132 of the compound AI system 110, which then formats and presents the ranked results to the user 610. In the process flow of FIG. 6B, the same response path is followed, but the initial source of semantic components comes from a known entity lookup and embedding generation before similarity search. In both workflows, step 570 is where the user 610 receives a clear, usable output derived from the semantic intelligence captured in the semantic entity index 460.

Example Machine Learning Architecture

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN), long short-term memory networks (LSTM), transformers, linear recurrent neural networks such as Mamba may also be used. For example, various query decomposition tasks performed by a query decomposition engine, semantic similarity matching tasks performed by a semantic search engine, and other processes may apply one or more machine learning and deep learning techniques.

One or more deep neural networks (DNNs) may be used in various embodiments. A DNN may refer to an AI model that includes at least 5 hidden layers, at least 50 learnable computational nodes in the aggregate across the hidden layers, at least 2,000 trainable parameters, which may include weights, biases, attention tensors, or other learned coefficients. In some embodiments, the DNN may include between 5 and 16 hidden layers. In some embodiments, the DNN may include between 16 and 64 hidden layers. In some embodiments, the DNN may include between 64 and 256 hidden layers. In some embodiments, the DNN may include between 256 and 1,000 hidden layers. In some embodiments, the DNN may include more than 1,000 layers. In some embodiments, the number of learnable computational nodes may range from 50 to 1,000. In some embodiments, the number of learnable computational nodes may range from 1,000 to 10,000. In some embodiments, the number of learnable computational nodes may range from 10,000 to one million. In some embodiments, the number of learnable computational nodes may exceed one million. In some embodiments, the total number of trainable parameters may range from 2,000 to 10,000. In some embodiments, the total number of trainable parameters may range from 10,000 to 100,000. In some embodiments, the total number of trainable parameters may range from 100,000 to one million. In some embodiments, the total number of trainable parameters may range from one million to one billion. In some embodiments, the total number of trainable parameters may range from one million to ten million. In some embodiments, the total number of trainable parameters may range from ten million to a hundred million. In some embodiments, the total number of trainable parameters may range from a hundred million to a billion. In some embodiments, the total number of trainable parameters may exceed one billion. These embodiments encompass neural networks of varying sizes and complexities, including convolutional networks, recurrent networks, transformer-based architectures, and other variants that meet the minimum structural thresholds described above.

In various embodiments, the training techniques for a machine learning model may be supervised, semi-supervised, or unsupervised. In supervised learning, the machine learning models may be trained with a set of training samples that are labeled. For example, for a machine learning model trained to classify named entities, the training samples may be entity profiles containing descriptive text and structured attributes. The labels for each training sample may be binary or multi-class. In training a machine learning model for industry classification, the training labels may include a positive label that indicates the entity belongs to a certain industry and a negative label that indicates the entity does not belong to that industry. In some embodiments, the training labels may also be multi-class such as multiple industry categories.

By way of example, the training set may include multiple past records with known outcomes. Each training sample in the training set may correspond to a past entity record and the corresponding outcome may serve as the label for the sample. A training sample may be represented as a feature vector that includes multiple dimensions. Each dimension may include data of a feature, which may be a quantized value of an attribute that describes the past record. For example, in a machine learning model that is used to determine similarity between companies, the features in a feature vector may include industry category, revenue range, geographic location, and target customer type. In various embodiments, certain pre-processing techniques may be used to normalize the values in different dimensions of the feature vector.

In some embodiments, an unsupervised learning technique may be used. The training samples used for an unsupervised model may also be represented by feature vectors, but may not be labeled. Various unsupervised learning techniques such as clustering may be used in determining similarities among the feature vectors, thereby categorizing the training samples into different clusters. In some cases, the training may be semi-supervised with a training set having a mix of labeled samples and unlabeled samples.

A machine learning model may be associated with an objective function, which generates a metric value that describes the objective goal of the training process. The training process may intend to reduce the error rate of the model in generating predictions. In such a case, the objective function may monitor the error rate of the machine learning model. In a model that generates predictions, the objective function of the machine learning algorithm may be the training error rate when the predictions are compared to the actual labels. Such an objective function may be called a loss function. Other forms of objective functions may also be used, particularly for unsupervised learning models whose error rates are not easily determined due to the lack of labels. In some embodiments, in a model for ranking semantically similar entities, the objective function may correspond to maximizing similarity scores for correct matches and minimizing scores for incorrect matches. In various embodiments, the error rate may be measured as cross-entropy loss, L1 loss, or L2 loss.

Figure 7:
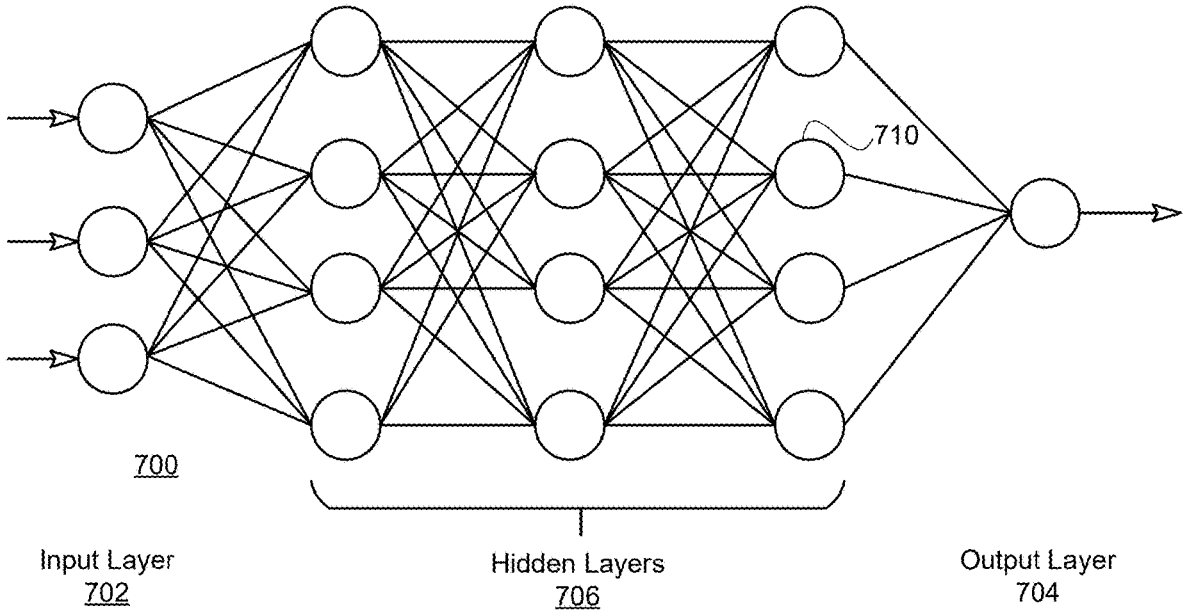
FIG. 7 is a conceptual diagram illustrating the structure of an example neural network, in accordance with some embodiments.

Referring to FIG. 7, a structure of an example neural network is illustrated, in accordance with some embodiments. The neural network 700 may receive an input and generate an output. The input may be the feature vector of a training sample in the training process and the feature vector of an actual case when the neural network is making an inference. The output may be the prediction, classification, or another determination performed by the neural network. The neural network 700 may include different kinds of layers, such as convolutional layers, pooling layers, recurrent layers, fully connected layers, and custom layers. A convolutional layer convolves the input of the layer with one or more kernels to generate feature maps. Each convolution result may be associated with an activation function. A convolutional layer may be followed by a pooling layer that selects the maximum value or average value from the portion of the input covered by the kernel size. The pooling layer reduces the spatial size of the extracted features. In some embodiments, a pair of convolutional layer and pooling layer may be followed by a recurrent layer that includes one or more feedback loops. The feedback may be used to account for spatial or temporal relationships. The layers may be followed by multiple fully connected layers that have nodes connected to each other. The fully connected layers may be used for classification or object detection. In one embodiment, one or more custom layers may also be presented for the generation of a specific format of the output. For example, a custom layer may be used for segmenting entity profiles into labeled sections.

The order of layers and the number of layers of the neural network 700 may vary in different embodiments. In various embodiments, a neural network 700 includes one or more layers 702, 704, and 706, but may or may not include any pooling layer or recurrent layer. If a pooling layer is present, not all convolutional layers are always followed by a pooling layer. A recurrent layer may also be positioned differently at other locations of the CNN. For each convolutional layer, the sizes of kernels and the numbers of kernels allowed to be learned may be different from other convolutional layers.

A machine learning model may include certain layers, nodes 710, kernels and/or coefficients. Training of a neural network, such as the NN 700, may include forward propagation and backpropagation. Each layer in a neural network may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operations such as convolution of data with kernels, pooling, recurrent loops, or gates in LSTM. The functions may also include an activation function that adjusts the weight of the node's output. Nodes in different layers may be associated with different functions.

Training of a machine learning model may include an iterative process that includes iterations of making determinations, monitoring the performance of the machine learning model using the objective function, and backpropagation to adjust the weights in various nodes 710. Training may include initial training, fine tuning, pre-training, post-training, and other stages of training. A computing device may receive a training set that includes labeled entity profile data with associated attributes. Each training sample in the training set may be assigned with labels indicating categories such as industry, product type, or customer group. The computing device, in forward propagation, may use the machine learning model to generate predicted categories. The computing device may compare the predicted categories with the labels of the training sample. The computing device may adjust, in backpropagation, the weights of the machine learning model based on the comparison. The computing device backpropagates one or more error terms obtained from one or more loss functions to update a set of parameters of the machine learning model.

By way of example, each of the functions in the neural network may be associated with different coefficients that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through the network in the forward direction, the results may be compared to the training labels or other values in the training set to determine the network's performance. The process of prediction may be repeated for other samples in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable or after a predetermined number of rounds for a particular set of training samples. The trained machine learning model can be used for performing semantic entity search or another suitable task for which the model is trained.

In various embodiments, the training samples described above may be refined and continue to re-train the model, improving the model's ability to perform inference tasks. In some embodiments, this training and re-training process may repeat, resulting in a computer system that continues to improve its functionality through a continuous use-retraining cycle. For example, after the model is initially trained, multiple rounds of re-training may be performed. The process may include periodically retraining the machine learning model. The periodic retraining may include obtaining an additional set of training data, such as from newly ingested documents, new structured system entries, or user feedback. The additional set of training data and later retraining may be based on updated data describing current parameters in entity profiles. The process may also include applying the additional set of training data to the machine learning model and adjusting parameters based on the application of the data. The retraining may be triggered by criteria such as a predictive accuracy metric or a loss function value falling below a threshold.

In some embodiments, model distillation may be used to transfer knowledge from a trained model to another model with reduced complexity while maintaining similar predictive performance. A trained model, often referred to as a teacher model, may generate outputs such as logits, confidence scores, or probability distributions over possible predictions. These outputs may serve as soft labels for training a student model, which typically has fewer parameters or a more efficient architecture. The student model may learn to approximate the teacher model's decision boundary by minimizing the difference between its own predictions and the teacher model's outputs. This process may involve loss functions such as Kullback-Leibler (KL) divergence or cross-entropy loss with temperature scaling to ensure that the student model effectively captures the patterns and representations learned by the teacher model.

In some embodiments, model distillation may be performed using different techniques depending on the level of knowledge transfer between the teacher and student models. One common approach is logit-based distillation, where the student model learns from the soft probability distributions produced by the teacher model instead of hard class labels. The temperature parameter in the softmax function may be adjusted to smooth the probability distribution, allowing the student model to capture subtle relationships between classes. Another approach is feature-based distillation, where intermediate feature representations from the teacher model are used to guide the student model's learning process. In this method, layer activations, embeddings, or attention maps from the teacher model may be matched with corresponding layers in the student model to enforce structural similarity. Additionally, response-based distillation may be used, where the teacher model's decisions, such as classification outputs or ranking scores, are directly used to supervise the student model. In some cases, hybrid approaches may combine multiple distillation techniques to optimize both predictive accuracy and model efficiency. By selecting an appropriate distillation strategy, a system may tailor knowledge transfer to specific tasks and deployment constraints.

In some embodiments, model distillation may be applied in scenarios where computational efficiency is a priority, such as deploying models on edge devices, mobile applications, or cloud environments with resource constraints. The distilled student model may inherit the generalization ability of the teacher model while reducing memory footprint and inference latency. In some cases, multiple teacher models may be used to provide diverse outputs, allowing the student model to integrate knowledge from different sources. The distillation process may also incorporate additional regularization techniques, such as weight pruning or quantization, to further optimize the student model's efficiency. By leveraging model distillation, a system may achieve a balance between model performance and computational efficiency, enabling scalable deployment across various machine learning applications.

Example Transformer

Figure 8:
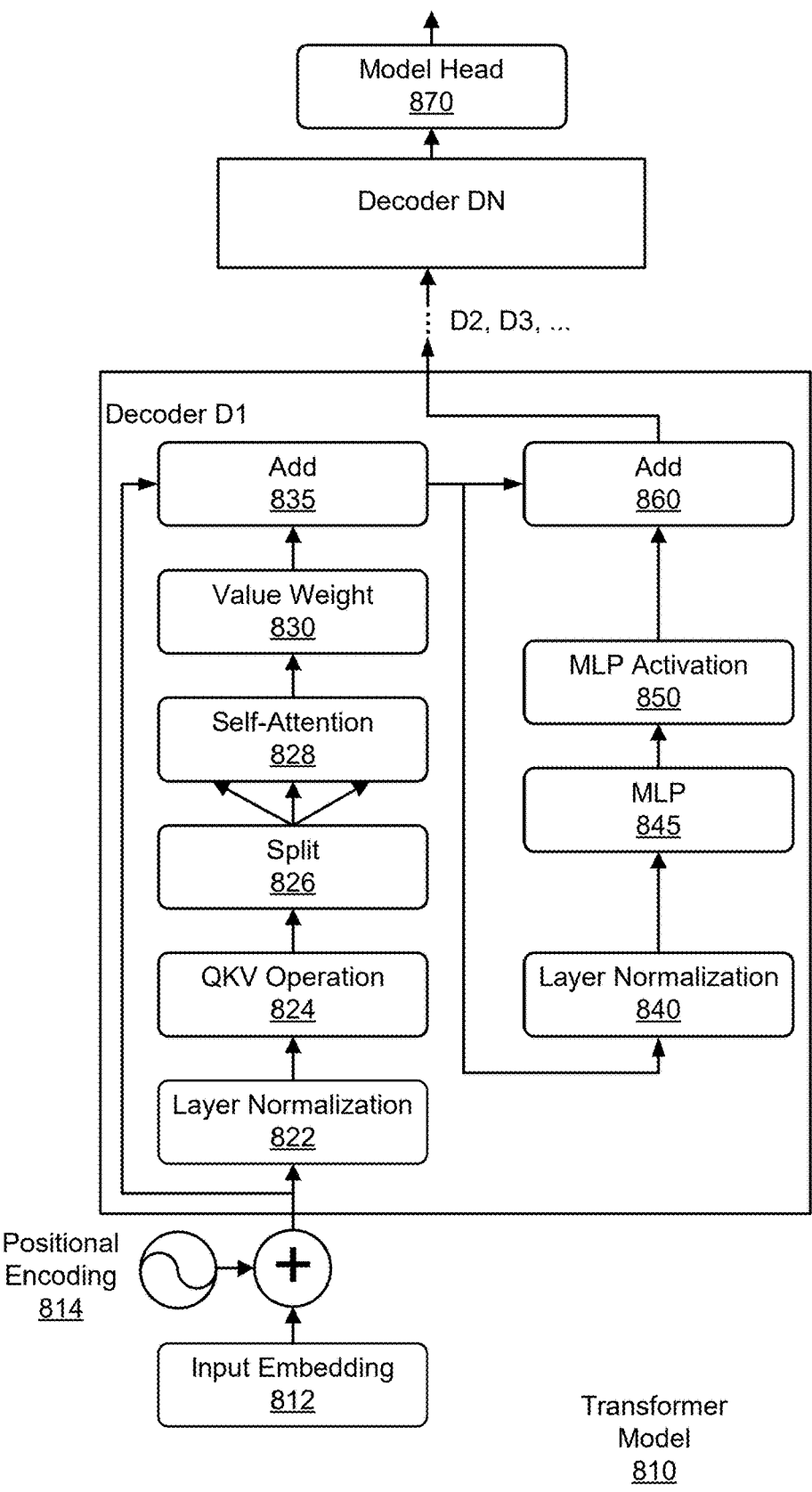
FIG. 8 is a conceptual diagram of functional blocks of a transformer-based DNN, in accordance with some embodiments.

FIG. 8 is a conceptual diagram of functional blocks of a transformer-based neural network model 810, in accordance with some embodiments. For simplicity, the transformer-based neural network model 810 is referred to as a transformer model 810. The transformer model 810 is an example of a machine learning model that is discussed in this disclosure. An actual transformer model 810 may be a large language model that involves numerous neurons, such as a large number of decoders, and a large number of parameters. The structure illustrated in FIG. 8 is part of a decoder for generating token attention. In a language processing task, the input may take the form of a sequence of words (e.g., a prompt) that may be encoded to a sequence of input tokens. For a semantic query decomposition and entity similarity search task, the input may take the form of a string sequence or any suitable input as discussed in this disclosure. Each token may represent a respective embedding in a latent space. Based on the input tokens, the transformer model 810 may repeatedly generate a sequence of output tokens in an autoregressive manner.

In some embodiments, a transformer model 810 includes a set of N decoders, D1, D2, . . . , and DN. A decoder receives a set of input representations and generates a set of output representations. For example, the first decoder D1 generates a set of output representations. Each subsequent decoder may receive the set of output representations of a previous decoder and generate another set of output representations. For example, the second decoder D2 placed after the first decoder D1 may receive the set of output representations generated by the first decoder D1, and generate another set of output representations. This process is repeated until the set of output representations for the final decoder is generated. The representations in each decoder may be latent representations that may or may not correspond to any real-world concepts. In some embodiments, some of the decoders may correspond to analyzing data dimensions that correspond to various types of data that are used to perform semantic indexing and similarity matching, such as industry classifications, product or service descriptions, and end-customer categories.

The transformer model 810 may include a model head block 870 that receives the set of output representations from the final decoder DN and generates an output token as the output for the current iteration.

As shown in FIG. 8, a decoder in the transformer model 810 includes a first layer normalization block 822, a query-key-value (QKV) operation block 824, a split block 826, a self-attention block 828, a value weight block 830, a first add block 835, a second layer normalization block 840, a multi-layer perceptron (MLP) block 845, an MLP activation block 850, and a second add block 860. While the operations in the first decoder D1 are described as an example, the remaining decoders in the set may include similar operations as the first decoder D1.

FIG. 8 illustrates a flow for attention mechanism of a transformer model 810. The transformer model 810 receives an input sequence, such as a natural language string query for finding one or more named entities. Each symbol may be converted into a token that takes the form of an embedding vector. The sequence of symbols may be represented as a matrix of embedding vectors with each embedding vector being arranged in a row of the matrix. The layer normalization block 822 receives an input dataset (e.g., the matrix of embedding vectors) and normalizes the data values to generate a normalized dataset (e.g., a normalized matrix).

In some embodiments, during training, the transformer model 810 may be trained in an autoregressive manner using masked label prediction. The input to the model may be a sequence of tokens derived from a domain-specific query or entity profile data. To simulate the prediction task, the computing device may apply masking to selected positions in the sequence, wherein the masked tokens represent unknown or hidden token labels. The masking may be implemented within the decoder, such that each position in the sequence may attend only to previously seen or unmasked positions. The masked positions are excluded from attention during self-attention computation and are predicted based on the contextual embeddings of unmasked tokens. The training objective may include minimizing the prediction error between the masked positions and their true labels, thereby enabling the transformer model 810 to learn long-range dependencies and improve smoothing accuracy for sequence-level inference.

The QKV operation block 824 receives the normalized input dataset and performs three separate projections to respectively generate a query matrix, a key matrix, and a value matrix. Specifically, the QKV operation may apply a QKV weight matrix, which is a trained set of parameters of the transformer model 810, to the normalized dataset. The operation may include a matrix multiplication between a weight matrix and the normalized input dataset. The QKV operation may model the relationships between query terms, context words, and value features described in this disclosure.

The split block 826 may split the output of the QKV operation block 824 into a query matrix, a key matrix, and a value matrix. The self-attention block 828 receives the query matrix, the key matrix, and the value matrix as the inputs and generates an attention matrix. The generation of an attention matrix includes multiplying the query matrix and a transposed version of the key matrix. In generating attention scores, a softmax operation to each row of the attention matrix may be applied. In some embodiments, the softmax operation converts the logit scores into probability distributions over the tokens. Conceptually, the attention score may be represented by an equation attention=softmax (Q*K/Scale). The probability distribution allows the transformer model 810 to weigh the relevance of each token in the context of others to perform semantic parsing and matching that is represented by tokens.

The value weight block 830 receives data related to the attention score and generates an attention dataset. The output for each token is a weighted combination of value vectors with the weights given by the attention scores determined in the self-attention block 828. The outputs of the value weight block 830 may be computed by a matrix multiplication between the value matrix and the attention matrix after softmax is applied. The add block 835 concatenates results from various layers. The results of the attention sublayer, including results from add block 835, may be further normalized using the second layer normalization block 840.

A decoder may include one or more multi-layer perceptron (MLP) blocks 845 that include additional neural network layers, which may take the form of feed-forward fully connected layers. One or more MLP blocks 845 may include an MLP activation block 850. In some embodiments, an MLP activation block 850, which typically includes a nonlinear activation function, may be nestled between two linear MLP blocks 845. The MLP blocks 845 along with the MLP activation block 850 may be used to introduce nonlinearity, perform feature extraction, reduce dimensionality and select tokens for the next decoder. In some embodiments, the activation function used in the MLP activation block 850 may be any suitable activation function such as a sigmoid function, a hyperbolic tangent function (tanh), a rectified linear unit function (ReLU), or a Gaussian Error Linear Unit function (GeLU). Outputs of the MLP blocks may be further concatenated in the add block 860.

The output of the first decoder D1 is passed to a subsequent decoder. This process is repeated until the set of output data from the final decoder DN is generated. While each decoder may involve similar operations as the first decoder D1, the trained set of parameter values that are associated with the operations may be different from decoder to decoder. The model head block 870 receives output from the final decoder DN to determine an output token. An additional softmax operation may be performed at LM head block 870 to determine the final attention scores. The LM head block 870 may select the next token.

ADDITIONAL EMBODIMENTS

Embodiment 1. A computer-implemented method, comprising: deploying one or more components of a compound AI system in a domain, the domain including domain specific data; crawling the domain specific data to extract a plurality of named entities from the domain specific data; determining a set of semantic understandings of the plurality of named entities, each named entities including one or more semantic understandings of the named entities based on the named entities' characteristics that are identified from the domain specific data; converting the set of semantic understandings into a plurality of embedding vectors; associating each embedding vector with an entity identifier to signify that the embedding vector belongs to a named entity corresponding to the entity identifier; and storing the plurality of embedding vectors into a semantic index for entity retrieval, wherein the entity retrieval comprises retrieving one or more target named entities by vector comparison.

Embodiment 2. The computer-implemented method of embodiment 1, wherein the domain specific data comprises structured data and unstructured data.

Embodiment 3. The computer-implemented method of embodiment 2, wherein crawling the structured data comprises: accessing one or more structured data sources associated with the domain, the structured data sources including a connected enterprise service; retrieving records containing attributes of named entities from the structured data sources; identifying predetermined fields in the records corresponding to semantic dimensions used for entity indexing; and extracting values from the predetermined fields for storage in association with persistent entity identifiers.

Embodiment 4. The computer-implemented method of embodiment 2, wherein crawling the unstructured data comprises: accessing one or more unstructured data sources associated with the domain, the unstructured data sources including document repositories, email archives, and/or internal messaging platforms; retrieving unstructured content containing narrative information related to named entities; parsing the unstructured content to identify text segments relevant to generated semantic dimensions; and storing the unstructured content in association with entity identifiers for subsequent semantic enrichment.

Embodiment 5. The computer-implemented method of embodiment 1, wherein the one or more components of the compound AI system deployed in the domain as a tenant-side AI system.

Embodiment 6. The computer-implemented method of embodiment 1, wherein determining a set of semantic under-standings of the plurality of named entities comprises: retrieving characteristics associated with each named entity from domain-specific data sources; identifying values for predefined semantic fields; analyzing the characteristics using a large language model to populate the predefined fields; and storing the populated semantic fields in associa-tion with the corresponding named entities.

Embodiment 7. The computer-implemented method of embodiment 1, wherein determining a set of semantic under-standings of the plurality of named entities comprises: retrieving data associated with each named entity from one or more structured and unstructured data sources; analyzing the retrieved data using a large language model to identify relevant fields from the data; extracting semantic descriptors from the relevant fields; and associating the semantic descriptors with corresponding named entities.

Embodiment 8. The computer-implemented method of embodiment 1, wherein converting the set of semantic understandings into a plurality of embedding vectors com-prises: generating a textual description for each semantic understanding of a named entity; applying a vectorization model to transform each textual description into an embed-ding vector; and storing the embedding vector in a semantic field and a corresponding entity identifier.

Embodiment 9. The computer-implemented method of embodiment 1, wherein associating each embedding vector with an entity identifier comprises: assigning an entity identifier to each named entity; and linking the embedding vectors corresponding to the semantic understandings of the named entity to the entity identifier.

Embodiment 10. The computer-implemented method of embodiment 1, wherein the semantic index comprises: a plurality of field-specific vector indexes, each field-specific vector index corresponding to a semantic dimension; and the plurality of embedding vectors stored in each field-specific vector index, each embedding vector associated with an entity identifier.

Embodiment 11. The computer-implemented method of embodiment 1, wherein the entity retrieval comprises: receiving a natural language query from a client device; decomposing the query into components corresponding to semantic dimensions of the semantic index; generating query embeddings from the components; searching one or more field-specific vector indexes for embeddings similar to the query embeddings; and identifying named entities cor-responding to the similar embeddings.

Embodiment 12. A computer-implemented method, com-prising: receiving a query from a user in a natural language string, the query for finding one or more named entities that are associated with domain specific data of a domain; invoking a transformer-based deep neural network (DNN) to decompose the natural language string into one or more semantic components, each semantic components compris-ing a version of the natural language string, each semantic components being in natural language; converting the one or more semantic components into one or more query embed-dings; searching for a semantic index that stores a plurality of semantic embeddings that are associated with a plurality of named entities that are formerly analyzed by the domain, wherein the semantic index comprises a set of semantic understandings of the plurality of named entities that is represented as the semantic embeddings, the semantic understandings are extracted based on characteristics of the named entities that are identified from the domain specific data; identifying, from the semantic index, one or more semantic embeddings that are similar to the one or more query embeddings; identifying one or more named entities that are associated with the one or more semantic embed-dings; and generating a response to the query based on the one or more named entities, the response include the one or more named entities that are formerly analyzed by the domain and match the natural language string.

Embodiment 13. The computer-implemented method of embodiment 12, wherein the version of the natural language string is a portion of the natural language string or an interpreted understanding that is generated by the trans-former-based DNN.

Embodiment 14. The computer-implemented method of embodiment 12, wherein invoking the transformer-based DNN to decompose the natural language string into the one or more semantic components comprises: identifying por-tions of the natural language string that correspond to predefined semantic dimensions used in the semantic index; extracting the relevant natural language phrases for each identified semantic dimension; normalizing the extracted phrases to remove extraneous linguistic content while pre-serving semantic meaning; generating interpreted natural language versions that capture the intent of each phrase with respect to the semantic dimension; and associating each interpreted phrase with a corresponding dimension label for embedding generation.

Embodiment 15. The computer-implemented method of embodiment 12, wherein the natural language string com-prises a target named entity, wherein invoking the trans-former-based DNN to decompose the natural language string into the one or more semantic components comprises: detecting the presence of the named entity in the natural language string; extracting the named entity from the string and matching it to a stored record in a domain-specific entity database; retrieving stored semantic dimension values asso-ciated with the matched named entity; and generating inter-preted semantic components from the retrieved dimension values for use in similarity searching.

Embodiment 16. The computer-implemented method of embodiment 15, wherein identifying, from the semantic index, one or more semantic embeddings comprises: embed-ding each semantic dimension value retrieved from the target named entity; searching dimension-specific vector indexes of the semantic index with the corresponding embeddings to produce nearest neighbor results in each dimension; aggregating the nearest neighbor results across multiple dimensions into a unified candidate set; and ranking the candidate set based on aggregated semantic similarity scores.

Embodiment 17. The computer-implemented method of embodiment 12, wherein identifying the one or more named entities that are associated with the one or more semantic embeddings comprises: retrieving the named entity identi-fier that is stored in association with each semantic embed-ding in the semantic index; mapping each matching embed-ding to its corresponding named entity identifier; and merging identifiers across dimension-specific searches to produce a consolidated list of matching named entities.

Embodiment 18. The computer-implemented method of embodiment 12, wherein the semantic index is generated by: extracting relevant structured fields from a structured data source in the domain; parsing unstructured documents associated with the same named entity; combining extracted structured and unstructured information into a normalized data model; and generating semantic descriptors for each semantic dimension from the normalized data model.

Embodiment 19. The computer-implemented method of embodiment 12, wherein identifying the one or more named entities that are associated with the one or more semantic embeddings comprises: determining, for each named entity in the semantic index, a count of semantic embeddings that are similar to at least one of the query embeddings; selecting as candidate named entities those named entities having a highest count of similar semantic embeddings; computing an aggregated similarity score for each candidate named entity based on the similarity of its matching semantic embeddings to the query embeddings; and ranking the candidate named entities in descending order of the aggregated similarity scores.

Embodiment 20. The computer-implemented method of embodiment 12, wherein the query is received from a user interface operated by a server and the semantic index resides on a tenant-side AI system that is operated within the domain.

Embodiment 21. The computer-implemented method of embodiment 12, wherein the semantic index comprises a plurality of separate vector indexes, each vector index corresponding to a semantic dimension used to characterize the named entities.

Embodiment 22. The computer-implemented method of embodiment 12, wherein the semantic index is populated by extracting data from both structured data sources and unstructured data sources within the domain.

Embodiment 23. The computer-implemented method of embodiment 12, wherein identifying, from the semantic index, the one or more semantic embeddings comprises: applying a ranking algorithm to order the matching named entities based on aggregated similarity scores across multiple semantic dimensions.

Embodiment 24. The computer-implemented method of embodiment 12, wherein the semantic index supports hybrid retrieval in which semantic similarity search results are filtered or combined with keyword search results over associated documents for each named entity.

Embodiment 25. The computer-implemented method of embodiment 24, wherein keyword search is performed over a document database that stores parsed content linked to named entities via a precomputed mapping.

Embodiment 26. The computer-implemented method of embodiment 12, wherein the transformer-based DNN is configured to dynamically create additional semantic components upon detecting attributes in the domain-specific data.

ADDITIONAL CONSIDERATIONS

The foregoing description of the embodiments has been presented for the purpose of illustration; it is not intended to be exhaustive or to limit the patent rights to the precise forms disclosed. While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure. Persons skilled in the relevant art can appreciate that many modifications and variations are possible in light of the above disclosure.

The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A compound artificial intelligence (AI) system, comprising:

a user device configured to display a query interface to receive a query from a user in a natural language string, the query for finding one or more named entities that are associated with domain specific data of a domain;

a data store storing a semantic index comprising a plurality of semantic embeddings that are associated with a plurality of named entities that are formerly analyzed by the domain, wherein the semantic index comprises a set of semantic understandings of the plurality of named entities that is represented as the semantic embeddings, the semantic understandings are extracted based on characteristics of the named entities that are identified from the domain specific data, and wherein the semantic index is generated by:

extracting relevant structured fields from a structured data source in the domain, parsing unstructured documents associated with the same named entity, combining extracted structured and unstructured information into a normalized data model, and generating semantic descriptors for each semantic dimension from the normalized data model; and a computing device comprising memory and one or more processors, wherein the memory stores computer code comprising executable instructions, wherein the instructions, when executed by the one or more processors, cause the one or more processors to:

invoke a transformer-based deep neural network (DNN) to decompose the natural language string into one or more semantic components, each semantic component comprising a version of the natural language string, each semantic component being in natural language;

convert the one or more semantic components into one or more query embeddings;

search for the semantic index;

identify, from the semantic index, one or more semantic embeddings based on the one or more query embeddings;

identify one or more named entities that are associated with the one or more semantic embeddings; and generate a response to the query based on the one or more named entities, the response include the one or more named entities that are formerly analyzed by the domain and match the natural language string.

2. The system of claim 1, wherein the version of the natural language string is a portion of the natural language string or an interpreted understanding that is generated by the transformer-based DNN.

3. The system of claim 1, wherein the natural language string comprises a target named entity, and wherein the instruction to invoke the transformer-based DNN to decompose the natural language string into the one or more semantic components comprises instructions to:

detect a presence of the named entity in the natural language string;

extract the named entity from the string and matching it to a stored record in a domain-specific entity database;

retrieve stored semantic dimension values associated with the matched named entity; and generate interpreted semantic components from the retrieved dimension values for use in similarity searching.

4. The system of claim 3, wherein the instruction to identify, from the semantic index, one or more semantic embeddings comprises instructions to:

embed each semantic dimension value retrieved from the target named entity;

search dimension-specific vector indexes of the semantic index with corresponding embeddings to produce nearest neighbor results in each dimension;

aggregate the nearest neighbor results across multiple dimensions into a unified candidate set; and rank the candidate set based on aggregated semantic similarity scores.

5. A computer-implemented method, comprising:

receiving a query from a user in a natural language string, the query for finding one or more named entities that are associated with domain specific data of a domain;

invoking a transformer-based deep neural network (DNN) to decompose the natural language string into one or more semantic components, each semantic component comprising a version of the natural language string, each semantic component being in natural language;

converting the one or more semantic components into one or more query embeddings;

searching for a semantic index that stores a plurality of semantic embeddings that are associated with a plurality of named entities that are formerly analyzed by the domain, wherein the semantic index comprises a set of semantic understandings of the plurality of named entities that is represented as the semantic embeddings, the semantic understandings are extracted based on characteristics of the named entities that are identified from the domain specific data, and wherein the semantic index is generated by:

extracting relevant structured fields from a structured data source in the domain, parsing unstructured documents associated with the same named entity, combining extracted structured and unstructured information into a normalized data model, and generating semantic descriptors for each semantic dimension from the normalized data model;

identifying, from the semantic index, one or more semantic embeddings based on the one or more query embeddings;

identifying one or more named entities that are associated with the one or more semantic embeddings; and generating a response to the query based on the one or more named entities, the response include the one or more named entities that are formerly analyzed by the domain and match the natural language string.

6. The computer-implemented method of claim 5, wherein the version of the natural language string is a portion of the natural language string or an interpreted understanding that is generated by the transformer-based DNN.

7. The computer-implemented method of claim 5, wherein invoking the transformer-based DNN to decompose the natural language string into the one or more semantic components comprises:

identifying portions of the natural language string that correspond to predefined semantic dimensions used in the semantic index;

extracting relevant natural language phrases for each identified semantic dimension;

normalizing the extracted phrases to remove extraneous linguistic content while preserving semantic meaning;

generating interpreted natural language versions that capture an intent of each phrase with respect to the semantic dimension; and associating each interpreted phrase with a corresponding dimension label for embedding generation.

8. The computer-implemented method of claim 5, wherein the natural language string comprises a target named entity, and wherein invoking the transformer-based DNN to decompose the natural language string into the one or more semantic components comprises:

detecting a presence of the named entity in the natural language string;

extracting the named entity from the string and matching it to a stored record in a domain-specific entity database;

retrieving stored semantic dimension values associated with the matched named entity; and generating interpreted semantic components from the retrieved dimension values for use in similarity searching.

9. The computer-implemented method of claim 8, wherein identifying, from the semantic index, one or more semantic embeddings comprises:

embedding each semantic dimension value retrieved from the target named entity;

searching dimension-specific vector indexes of the semantic index with corresponding embeddings to produce nearest neighbor results in each dimension;

aggregating the nearest neighbor results across multiple dimensions into a unified candidate set; and ranking the candidate set based on aggregated semantic similarity scores.

10. The computer-implemented method of claim 5, wherein identifying the one or more named entities that are associated with the one or more semantic embeddings comprises:

retrieving the named entity identifier that is stored in association with each semantic embedding in the semantic index;

mapping each matching embedding to its corresponding named entity identifier; and merging identifiers across dimension-specific searches to produce a consolidated list of matching named entities.

11. The computer-implemented method of claim 5, wherein identifying the one or more named entities that are associated with the one or more semantic embeddings comprises:

determining, for each named entity in the semantic index, a count of semantic embeddings;

selecting as candidate named entities those named entities having a highest count of semantic embeddings;

computing an aggregated similarity score for each candidate named entity based on matching its matching semantic embeddings to the query embeddings; and ranking the candidate named entities in descending order of the aggregated similarity scores.

12. The computer-implemented method of claim 5, wherein the query is received from a user interface operated by a server and the semantic index resides on a tenant-side AI system that is operated within the domain.

13. The computer-implemented method of claim 5, wherein the semantic index comprises a plurality of separate vector indexes, each vector index corresponding to a semantic dimension used to characterize the named entities.

14. The computer-implemented method of claim 5, wherein the semantic index is populated by extracting data from both structured data sources and unstructured data sources within the domain.

15. The computer-implemented method of claim 5, wherein identifying, from the semantic index, the one or more semantic embeddings comprises:

applying a ranking algorithm to order the matching named entities based on aggregated similarity scores across multiple semantic dimensions.

16. The computer-implemented method of claim 5, wherein the semantic index supports hybrid retrieval in which semantic similarity search results are filtered or combined with keyword search results over associated documents for each named entity.

17. The computer-implemented method of claim 16, wherein a keyword search is performed over a document database that stores parsed content linked to named entities via a precomputed mapping.

18. The computer-implemented method of claim 5, wherein the transformer-based DNN is configured to dynamically create additional semantic components upon detecting attributes in the domain specific data.

19. A non-transitory computer-readable medium configured to store code comprising instructions, wherein the instructions, when executed by one or more processors, cause the one or more processors to:

receive a query from a user in a natural language string, the query for finding one or more named entities that are associated with domain specific data of a domain;

invoke a transformer-based deep neural network (DNN) to decompose the natural language string into one or more semantic components, each semantic component comprising a version of the natural language string, each semantic component being in natural language;

convert the one or more semantic components into one or more query embeddings;

search for a semantic index that stores a plurality of semantic embeddings that are associated with a plurality of named entities that are formerly analyzed by the domain, wherein the semantic index comprises a set of semantic understandings of the plurality of named entities that is represented as the semantic embeddings, the semantic understandings are extracted based on characteristics of the named entities that are identified from the domain specific data, and wherein the semantic index is generated by:

extracting relevant structured fields from a structured data source in the domain, parsing unstructured documents associated with the same named entity, combining extracted structured and unstructured information into a normalized data model, and generating semantic descriptors for each semantic dimension from the normalized data model;

identify, from the semantic index, one or more semantic embeddings based on the one or more query embeddings;

identify one or more named entities that are associated with the one or more semantic embeddings; and generate a response to the query based on the one or more named entities, the response include the one or more named entities that are formerly analyzed by the domain and match the natural language string.

* * * * *